US008726351B2

(12) United States Patent
Metzer et al.

(10) Patent No.: US 8,726,351 B2
(45) Date of Patent: May 13, 2014

(54) SYSTEMS AND METHODS FOR CONTROLLING ACCESS TO ELECTRONIC RECORDS IN AN ARCHIVES SYSTEM

(75) Inventors: Richard L. Metzer, Alexandria, VA (US); James E. Grant, Clarksville, MD (US); William T. Jackson, Damascus, MD (US); David P. Isaac, Bethesda, MD (US); Matthew J. McKennirey, Bethesda, MD (US); Kenneth L. Bedford, Reston, VA (US)

(73) Assignees: Lockheed Martin Corporation, Bethesda, MD (US); Electric Data Systems Corporation, Plano, TX (US); Business Performance Systems, Falls Church, VA (US); Fenestra Technologies Corporation, Germantown, MD (US)

( * ) Notice: Subject to any disclaimer, the term of this patent is extended or adjusted under 35 U.S.C. 154(b) by 1325 days.

(21) Appl. No.: 11/797,643

(22) Filed: May 4, 2007

(65) Prior Publication Data

US 2008/0072290 A1 Mar. 20, 2008

Related U.S. Application Data

(60) Provisional application No. 60/802,875, filed on May 24, 2006, provisional application No. 60/797,754, filed on May 5, 2006.

(51) Int. Cl.
*G06F 17/30* (2006.01)
*H04L 29/06* (2006.01)
*H04L 9/32* (2006.01)
*G06F 7/00* (2006.01)

(52) U.S. Cl.
USPC ............... 726/4; 726/27; 713/165; 713/166; 713/168; 707/625; 707/638; 707/640; 707/662; 707/667; 707/687

(58) Field of Classification Search
USPC ......... 726/4, 27; 713/165, 166, 168; 707/625, 707/638, 640, 662, 667, 687
See application file for complete search history.

(56) References Cited

U.S. PATENT DOCUMENTS

2006/0123232 A1* 6/2006 Cannon et al. ............... 713/165
2006/0229918 A1* 10/2006 Fotsch et al. ................. 705/3
2007/0011109 A1 1/2007 Wilson et al.

FOREIGN PATENT DOCUMENTS

WO WO 01/90951 11/2001

OTHER PUBLICATIONS

European Search Report published Sep. 25, 2007.

(Continued)

*Primary Examiner* — Aravind Moorthy
(74) *Attorney, Agent, or Firm* — Nixon & Vanderhye PC

(57) ABSTRACT

Systems and/or methods for controlling access to a plurality of records and/or documentary materials to be persisted in an electronic archives system are provided. The plurality of records and/or documentary material and all preserved information may be stored and accessed on the basis of user and/or object attributes. The user attributes include group affiliation, ownership, and state (e.g., workflow step and time of day). The object attributes include group affiliation, business role, clearance or access level, and network address from which access is requested. Access to the plurality of records and/or documentary material can be obtained both from within a single security domain as well as across more than one security domain.

12 Claims, 9 Drawing Sheets

(56) References Cited

OTHER PUBLICATIONS

Consultative Committee for Space Data Systems: "Reference Model for an Open Archival Information System, Issue: CCSDS 650.0-B-1, Blue Book, Issue 1" Recommendation for Space Data System Standards, Jan. 2002.

Consultative Committee for Space Data Systems: "Producer-Archive Interface Methodology Abstract Standard, Issue: CCSDS 651.0-B-1, Blue Book, Issue 1" Recommendation for Space Data System Standards, May 2004.

Good G: "The LDAP Data Interchange Format (LDIF)—Technical Specification" Oct. 19, 1999.

* cited by examiner

SYSTEMS AND METHODS FOR CONTROLLING ACCESS TO ELECTRONIC RECORDS IN AN ARCHIVES SYSTEM

CROSS-REFERENCES TO RELATED APPLICATIONS

This application claims the benefit of Application Ser. No. 60/802,875, filed on May 24, 2006, and Application Ser. No. 60/797,754, filed on May 5, 2006, each of which is incorporated herein by reference in its entirety.

This patent application discloses and claims subject inventions as defined by FAR 52.227-11 (1997). The U.S. Government has certain rights in the inventions disclosed and claimed herein.

TECHNICAL FIELD

The exemplary embodiments disclosed herein relate to systems and/or methods for controlling access to electronic records in an archives system. More particularly, the exemplary embodiments disclosed herein relate to a flexible and extensible way of controlling access to Automation Information System (AIS) objects (e.g., data records, software programs, archived or AIS files, software program functions) based on subject (i.e., user) attributes (e.g., group affiliation, business role, clearance or access level and network address from which access is requested), and object attributes (e.g., required clearance level, required group affiliation, ownership, and state (e.g., workflow step and time of day)). The exemplary embodiments function both within a single security domain (i.e., a Federation) as well as across security domains/Federations. The primary benefit of being able to operate across Federations is that it enables users who may only have an account in one Federation to discover the existence of records matching their search criteria in all Federations.

BACKGROUND

Since the earliest history, various institutions (e.g., governments and private companies alike) have recorded their actions and transactions. Subsequent generations have used these archival records to understand the history of the institution, the national heritage, and the human journey. These records may be essential to support the efficiency of the institution, to protect the rights of individuals and businesses, and/or to ensure that the private company or public corporation/company is accountable to its employees/shareholders and/or that the Government is accountable to its citizens.

With the advance of technology into a dynamic and unpredictable digital era, evidence of the acts and facts of institutions and the government and our national heritage are at risk of being irrecoverably lost. The challenge is pressing—as time moves forward and technologies become obsolete, the risks of loss increase. It will be appreciated that a need has developed in the art to develop securely accessible electronic records archives system and method especially, but not only, for the National Archives and Records Administration (NARA) in a system known as Electronic Records Archives (ERA), to resolve this growing problem, in a way that is substantially obsolescence-proof and policy neutral. While the exemplary embodiments described herein deal with respect to safeguarding the access to government records, the described embodiments are not limited to archives systems applications nor to governmental applications and can also be applied to other large scale storage applications, in addition to archives systems, and for businesses, charitable (e.g., non-profit) and other institutions, and entities.

Access control has previously been solved using Mandatory Access Controls (MAC), Discretionary Access Controls (DAC), Role Based Access Controls (RBAC), Content Based Access Controls (CBAC) or some combination of one or, at most, two of them. See for example, U.S. Pat. Nos. 6,088,679, 6,023,765 and 6,202,066.

Classical automated information system access controls were primarily implemented at the OS level with some control provided within applications. OS level controls consisted of Mandatory Access Controls (MAC) and Discretionary Access Controls (DAC). Access control was used primarily to restrict access to information system files. MAC provided for the assignment of clearances to individuals (subjects) and clearance restrictions to files (objects). The policy generally restricted access to objects with a clearance restriction of x to subjects who had clearances of x or higher. Individual (read, write, execute etc.) permissions were granted to groups into which subjects were assigned. DAC allowed for subjects to grant other subjects access to the objects they controlled. These access control methods did not allow the flexibility needed by modern automated information systems which resulted in the development of Role Based Access Control (RBAC). RBAC implements access control based on the business role a subject plays in an organization. While RBAC represents an improvement over DAC or MAC it still lacks the flexibility needed by modern AISs.

SUMMARY

A combination of MAC, DAC, RBAC and Content Based Access Control (CBAC) features are implemented in the exemplary embodiments to produce a flexible access control mechanism that provides maximum flexibility and efficiency.

An important aspect of the ERA is to preserve and to provide ready access to authentic electronic records of enduring value.

The ERA supports and flows from NARA's mission to ensure "for the Citizen and the Public Servant, for the President and the Congress and the Courts, ready access to essential evidence." This mission facilitates the exchange of vital ideas and information that sustains the United States of America. NARA is responsible to the American people as the custodian of a diverse and expanding array of evidence of America's culture and heritage, of the actions taken by public servants on behalf of American citizens, and of the rights of American citizens. The core of NARA's mission is that this essential evidence must be identified, preserved, and made accessible for as long as authentic records are needed—regardless of form.

The creation and use of an unprecedented and increasing volume of Federal electronic records—in a wide variety of formats, using evolving technologies—poses a problem that the ERA must solve. An aspect of the invention involves an integrated ERA solution supporting NARA's evolving business processes to identify, preserve, and make accessible authentic, electronic records of enduring value—for as long as they are needed.

The ERA can be used to store, process, and/or disseminate a private institution's records. That is the ERA may store records pertaining to a private institution or association, and/or the ERA may be used by a first entity to store the records of a second entity. System solutions, no matter how elegant, may be integrated with the institutional culture and organizational processes of the users.

Since 1934, NARA has developed effective and innovative processes to manage the records created or received, maintained or used, and destroyed or preserved in the course of public business transacted throughout the Federal Government. NARA played a role in developing this records lifecycle concept and related business processes to ensure long-term preservation of, and access to, authentic archival records. NARA also has been instrumental in developing the archival concept of an authentic record that consists of four fundamental attributes: content, structure, context, and presentation.

NARA has been managing electronic records of archival value since 1968, longer than almost anyone in the world. Despite this long history, the diverse formats and expanding volume of current electronic records pose new challenges and opportunities for NARA as it seeks to identify records of enduring value, preserve these records as vital evidence of our nation's past, and make these records accessible to citizens and public servants in accordance with statutory requirements.

The ERA should support, and may affect, the institution's (e.g., NARA's) evolving business processes. These business processes mirror the records lifecycle and are embodied in the agency's statutory authority:

Providing guidance to Federal Agencies regarding records creation and records management;
Scheduling records for appropriate disposition;
Storing and preserving records of enduring value; and/or
Making records accessible in accordance with statutory and regulatory provisions.

Within this lifecycle framework, the ERA solution provides an integrated and automated capability to manage electronic records from: the identification and capture of records of enduring value; through the storage, preservation, and description of the records; to access control and retrieval functions.

Developing the ERA involves far more than just warehousing data. For example, the archival mission is to identify, preserve, and make available records of enduring value, regardless of form. This three-part archival mission is the core of the Open Archival Information System (OAIS) Reference Model, expressed as ingest, archival storage, and access. Thus, one ERA solution is built around the generic OAIS Reference Model (presented in FIG. 1), which supports these core archival functions through data management, administration, and preservation planning.

The ERA may coordinate with the front-end activities of the creation, use, and maintenance of electronic records by Federal officials. This may be accomplished through the implementation of disposition agreements for electronic records and the development of templates or schemas that define the content, context, structure, and presentation of electronic records along with lifecycle data referring to these records.

The ERA solution may complement NARA's other activities and priorities, e.g., by improving the interaction between NARA staff and their customers (in the areas of scheduling, transfer, accessioning, verification, preservation, review and redaction, and/or ultimately the ease of finding and retrieving electronic records).

Like NARA itself, the scope of ERA includes the management of electronic and non-electronic records, permanent and temporary records, and records transferred from Federal entities as well as those donated by individuals or organizations outside of the government. Each type of record is described and/or defined below.

ERA and Non-Electronic Records:

Although the focus of ERA is on preserving and providing access to authentic electronic records of enduring value, the system's scope also includes, for example, management of specific lifecycle activities for non-electronic records. ERA will support a set of lifecycle management processes (such as those used for NARA) for appraisal, scheduling, disposition, transfer, accessioning, and description of both electronic and non-electronic records. A common systems approach to appraisal and scheduling through ERA will improve the efficiency of such tasks for non-electronic records and help ensure that permanent electronic records are identified as early as possible within the records lifecycle. This same common approach will automate aspects of the disposition, transfer, accessioning, and description processes for all types of records that will result in significant workflow efficiencies. Archivists, researchers, and other users may realize benefits by having descriptions of both electronic and non-electronic records available together in a powerful, universal catalog of holdings. In an embodiment, some of ERA's capabilities regarding non-electronic records may come from subsuming the functionality of legacy systems such the Archival Research Catalog (ARC). To effectively manage lifecycle data for all types of records, in certain embodiments, ERA also may maintain data interchange (but not subsume) other legacy systems and likely future systems related to non-electronic records.

Permanent and Temporary Records:

There is a fundamental archival distinction between records of enduring historic value, such as those that NARA must retain forever (e.g., permanent records) and those records that a government must retain for a finite period of time to conduct ongoing business, meet statutory and regulatory requirements, or protect rights and interests (e.g., temporary records).

For a particular record series from the US Federal Government, NARA identifies these distinctions during the record appraisal and scheduling processes and they are reflected in NARA-approved disposition agreements and instructions. Specific records are actually categorized as permanent or temporary during the disposition and accessioning processes. NARA takes physical custody of all permanent records and some temporary records, in accordance with approved disposition agreements and instructions. While all temporary records are eventually destroyed, NARA ultimately acquires legal (in addition to physical) custody over all permanent records.

ERA may address the distinction between permanent and temporary records at various stages of the records life-cycle. ERA may facilitate an organization's records appraisal and scheduling processes where archivists and transferring entities may use the system to clearly identify records as either permanent or temporary in connection with the development and approval of disposition agreements and instructions. The ERA may use this disposition information in association with the templates to recognize the distinctions between permanent and temporary records upon ingest and manage these records within the system accordingly.

For permanent records this may involve transformation to persistent formats or use of enhanced preservation techniques to insure their preservation and accessibility forever. This also may apply to temporary records of long-term value, such as, for example, medical records. For example, any record that must be retained beyond the life of its originating system may need one or more "transformations" that maintain the authenticity of the records. For temporary records, NARA's Records Center Program (RCP) is exploring offering its customers an ERA service to ingest and store long-term temporary records in persistent formats. To the degree that the RCP opts to facilitate their customers' access to the ERA for appropriate preservation of long-term temporary electronic records, this same coordination relationship with transferring entities through the RCP will allow NARA to effectively capture permanent electronic records earlier in the records lifecycle. In the end, ERA may also provide for the ultimate destruction of temporary electronic records.

ERA and Donated Materials:

In addition to federal records, NARA also receives and accesses donated archival materials. Such donated collections comprise a significant percentage of NARA's Presidential Library holdings, for example. ERA may manage donated electronic records in accordance with deeds of gift of deposit agreements which, when associated with templates, may ensure that these records are properly preserved and made available to users. Although donated materials may involve unusual disposition instructions or access restrictions, ERA should be flexible enough to adapt to these requirements. Since individuals or institutions donating materials to NARA are likely to be less familiar with ERA than federal transferring entities, the system may also include guidance and tools to help donors and the NARA appraisal staff working with them insure proper ingest, preservation, dissemination of donated materials.

Systems are designed to facilitate the work of users, and not the other way around. One or more of the following illustrative classes of users may interact with the ERA: transferring entity; appraiser; records processor; preserver; access reviewer; consumer; administrative user; and/or a manager. The ERA may take into account data security, business process re-engineering, and/or systems development and integration. The ERA solution also may provide easy access to the tools the users need to process and use electronic records holdings efficiently.

NARA must meet challenges relating to archiving massive amounts of information, or the American people risk losing essential evidence that is only available in the form of electronic federal records. But beyond mitigating substantial risks, the ERA affords such opportunities as:

Using digital communication tools, such as the Internet, to make electronic records holdings, such as NARA's, available beyond the research room walls in offices, schools, and homes throughout the country and around the world;

Allowing users to take advantage of the information-processing efficiencies and capabilities afforded by electronic records;

Increasing the return on the public's investment by demonstrating technological solutions to electronic records problems that will be applied throughout our digital society in a wide variety of institutional settings; and/or Developing tools for archivists to perform their functions more efficiently.

According to one aspect of the invention, there is provided a system for ingesting, storing, and/or disseminating information. The system may include an ingest module, a storage module, and a dissemination module that may be accessed by a user via one or more portals.

In an aspect of certain embodiments, there is provided a system and method for automatically identifying, preserving, and disseminating archived materials. The system/method may include extreme scale archives storage architecture with redundancy or at least survivability, suitable for the evolution from terabytes to exabytes, etc.

In another aspect of certain embodiments, there is provided an electronic records archives (ERA), comprising an ingest module to accept a file and/or a record, a storage module to associate the file or record with information and/or instructions for disposition, and an access or dissemination module to allow selected access to the file or record. The ingest module may include structure and/or a program to create a template to capture content, context, structure, and/or presentation of the record or file. The storage module may include structure or a program to preserve authenticity of the file or record over time, and/or to preserve the physical access to the record or file over time. The access module may include structure and/or a program to provide a user with the ability to view/render the record or file over time, to control access to restricted records, to redact restricted or classified records, and/or to provide access to an increasing number of users anywhere at any time.

The ingest module may include structure or a program to auto-generate a description of the file or record. Each record may be transformed, e.g., using a framework that wraps and computerizes the record in a self-describing format with appropriate metadata to represent information in the template.

The ingest module, may include structure or a program to process a Submission Information Package (SIP), and/or an Archival Information Package (AIP). The access module may include structure or a program to process a Dissemination Information Packages (DIP).

Independent aspects of the invention may include the ingest module alone or one or more aspects thereof, the storage module alone or one or more aspects thereof; and/or the access module alone or one or more aspects thereof.

Still further aspects of the invention relate to methods for carrying out one or more functions of the ERA or components thereof (ingest module, storage module, and/or access module).

It is not enough just to preserve electronic records. Now and into the future, archivists must be able to attest to the authenticity of the preserved records to protect the rights and interests of various constituents. If records cannot be certified as authentic, there is a risk of unraveling the trust system upon which society is based.

In the words of Jeff Rothenberg of the Rand Corporation:

The relationship between digital preservation and authenticity stems from the fact that meaningful preservation implies the usability of that which is preserved. That is, the goal of preservation is to allow future users to retrieve, access, decipher, view, interpret, understand, and experience documents, data, and records in meaningful and valid (that is authentic) ways. An informational entity that is "preserved" without being usable in a meaningful and valid way has not been meaningfully preserved, i.e., has not been preserved at all.

The difficulty of defining a viable digital preservation strategy is partly the result of our failing to understand and appreciate the authenticity issues surrounding digital informational entities and the implications of these issues for potential technical solutions to the digital preservation problem. (See Jeff Rothenberg, Preserving Authentic Digital Information," in *Authenticity in a Digital Environment*, May 2000. Council on Library and Information Resources, pages 51-68.

In order to establish a common understanding, it is important to clarity four key concepts and the relationships among them—namely, reliability, authenticity, authentication, trustworthiness, and accessibility.

The InterPARES Project, an international collaboration researching the preservation of electronic records, defined reliability and authenticity. These definitions, in turn, have been adopted by most subsequent research projects and initiatives. A reliable record stands for the facts it contains—the record's content can be trusted. The reliability of a record depends upon, for example the completeness of the record's form, the control exercised over the process of creation, etc.

A reliable record has authority—that is, there is knowledge of who created the record, when it was created, how it was created, and the purpose for which it was created. Reliability generally is more the concern of the record's creator than its preserver. In some ways, reliability is a "given" (e.g., must be assumed) before records ever reach the electronic archives. Although unreliable records generally cannot be made reliable, the issue of reliability cannot be ignored.

In this vein, there are two options for establishing a policy related to the reliability of submitted records. First, all records submitted by institutions may be accepted. In this case it will be assumed that the records are reliable because the providers say so. Second, reliability criteria that providers must meet before records will be accepted may be established. The criteria may deal with completeness of the record, procedural controls over the creation of the records, etc. For example, the Authenticity Task Force of the InterPARES Project has established a set of criteria that may be used as a basis for setting such criteria.

The InterPARES Project defines an authentic record as "a record that is what it purports to be and is free from tampering or corruption." Broadly considered, the authenticity of records depends upon actions by both the Records Creator and the Records Preserver. In particular, the Records Creator generally is concerned with the "truth" of the original record, including, for example, the mode, form, and/or state of transmission of the records as drafts, originals, and/or copies. The Records Preserver generally is concerned with the manner of the maintenance, preservation, and custody of the records. The mode of transmission of the record generally is the means used to transmit a record across space and time, whereas the form of transmission generally is the physical carrier on which a record is received (e.g., paper, film, disk, magnetic tape, etc.).

For a record to be authentic (meaning that the record remains reliable over time), its preservation should occur under strict controls. Some questions that may be used when determining whether a record is authentic follow:
When was a record copied or migrated?
Who did the copying or migration?
How did the copying or migration take place?
What quality control processes governed the copying or migration?

"Trust" and "truthfulness" have become key aspects of an authentic record. Because conformity with "the truth" is a judgment, a determination of authenticity likewise will be a judgment. For example, though it is necessary to have an accurate bit stream, such a bit stream is not sufficient to have an "authentic record." It is this broad sense of authenticity that must be addressed. Indeed, authenticity includes issues such as, integrity, completeness, correctness, validity, faithfulness to an original, meaningfulness, and suitability for an intended purpose.

Although "authenticity" and "authentication" often are used together, they sometimes may be thought of as quite different concepts. By way of example and without limitation, authentication sometimes may be thought of as being a narrower term than authenticity. For example, authentication generally is a declaration about a record at a given time. The rules governing authentication may be established by legislation or other policy. Authentication generally means that the custodian of a record issues a statement saying that a record is authentic at this time. Authentication thus may be thought of as being external to the record itself and is temporary (as opposed to authenticity, which is a quality of the record that is to be constantly protected over the long-term). An "authenticated record" only can be as reliable as when the record was first issued by its creator. It certain embodiments, it may be useful to authenticate (e.g., certify) a record from time-to-time to indicate that authenticity is being maintained.

The Minnesota Historical Society has defined the concept of a "trustworthy information system." As stated in the TIS Handbook, "Trustworthiness refers to an information system's accountability and its ability to produce reliable and authentic information and records." In an embodiment, documentation and metadata are a part of a trustworthy information system, as they are useful in proper data creation, storage, retrieval, modification, retention, destruction, and the like.

Ensuring the authenticity over time of digital records is a major concern that has at least two aspects. A first aspect relates to checking and certifying data integrity (e.g., associated with technical processes such as integrity checking, certification, digital watermarking, steganography, and/or user and authentication protocols). A second aspect relates to identifying the intellectual qualities of information that make it authentic (e.g., associated with legal, cultural, and/or philosophical concepts such as trustworthiness and completeness).

According to Anne Gilliland-Swetland, "Preserving knowledge is more complex than preserving only media or content. It is about preserving the intellectual integrity of information objects, including capturing information about the various contexts within which information is created, organized, and used; organic relationships with other information objects; and characteristics that provide meaning and evidential value." Accordingly, one feature of certain exemplary embodiments relates to preserving knowledge and making it available and accessible. This complex task involves both technical and intellectual challenges.

Unfortunately, commercial systems for electronic archiving are built around storage and/or workflow technologies but do not provide the highest levels of authenticity support over indefinite periods of time. Moreover, commercial systems also tend to target archival needs within an enterprise and sometimes for compliance with targeted government regulations, such as Sarbanes Oxley, whereas a complete archives system (such as NARA) must accept records and other associated electronic assets (e.g., administrative information about the records) from other enterprises and has more stringent archival requirements. For example, as the custodian of the nation's archived electronic assets, NARA has to support basic rights of citizens and obligations of the government, such as military pensions and patents, which lead, for example, to indefinite retention requirements. Also, current electronic records archives systems and processes are manually intensive and do not provide comprehensive support for electronic records authenticity.

For example, it is noted that there are current commercial off-the-shelf (COTS) products that provide some elements of authenticity, but not all elements. EMC's Documentum and Centera products are examples. Certain example systems have implemented Documentum for forms (e.g., entry), workflow infrastructure, and content management of some data (e.g., business objects). Centera is a storage system that provides protection and some metadata and search capabilities, but it does not provide processes for authenticity. In general, COTS products would address specific regulatory requirements, such as, for example, Sarbanes Oxley, if anything, which target commercial business, rather than more stringent needs (e.g., of NARA) that the drive innovative solution of the example embodiments.

Thus, it will be appreciated that there is a need in the art for improved systems and/or methods that is/are scalable essentially without limitation for establishing and maintaining comprehensive authenticity of electronic records over an indefinite period of time in a substantially obsolescence-proof manner.

According to certain exemplary embodiments, a system for establishing and maintaining authenticity of a plurality of records and/or documentary materials to be persisted in and accessible from an electronic archives system is provided. Safeguarding programmed logic circuitry may be configured to safeguard each said record and/or documentary material throughout its entire lifecycle by monitoring and recording both intended changes to each said record and/or documentary material and its corresponding status, as well as unintended changes to each said record and/or documentary material. Extracting and preserving programmed logic circuitry may be configured to extract and preserve context and structure associated with each said record and/or documentary material. Custody programmed logic circuitry may be configured to establish and preserve substantially uninterrupted proof-of-custody including at least a source for each said record and/or documentary material throughout its entire lifecycle. Essential characteristic programmed logic circuitry may be configured to capture and preserve essential characteristics of each said record and/or documentary material throughout its lifecycle in dependence on one or more changeable definitions of essential characteristic. At least one storage location may be configured to store the plurality of records and/or documentary materials and all preserved information. Access control circuitry may be configured and/or programmed to allow user access to the archives system based on user attributes and object attributes. The archives system may be scalable essentially without limitation. The authenticity of the plurality of records and/or documentary materials may be comprehensively storable and maintainable over an indefinite period of time in a substantially obsolescence-proof manner despite changeability of the records and/or documentary materials, record and/or documentary material custody, and/or essential characteristic definitions.

According to certain other exemplary embodiments, a computer-implemented method tangibly embodied by at least instructions stored on a computer-readable storage medium for establishing and maintaining authenticity of a plurality of records and/or documentary materials to be persisted in and accessible from an electronic archives system is provided. Each record and/or documentary material may be safeguarded throughout its entire lifecycle by monitoring and recording both intended changes to each said record and/or documentary material and its corresponding status, as well as unintended changes to each said record and/or documentary material. Context and structure associated with each said record and/or documentary material may be extracted and preserved. Substantially uninterrupted proof-of-custody including at least a source may be established and preserved for each said record and/or documentary material throughout its entire lifecycle. Essential characteristics of each said record and/or documentary material may be captured and preserved throughout its lifecycle in dependence on one or more changeable definitions of essential characteristic. The plurality of record and/or documentary material and all preserved information may be stored. Access to the archives system may be predicated on user attributes and object attributes. The archives system may be scalable essentially without limitation. The authenticity of the plurality of record and/or documentary material may be comprehensively storable and maintainable over an indefinite period of time in a substantially obsolescence-proof manner despite changeability of the records and/or documentary materials, record and/or documentary material custody, and/or essential characteristic definitions.

According to still other exemplary embodiments, a computer-implemented method tangibly embodied by at least instructions stored on a computer-readable storage medium for establishing and maintaining authenticity of a plurality of records and/or documentary materials to be persisted in an electronic archives system is provided. Transfer media from a transferring entity may be inspected to ensure that said transfer media contains at least one record and/or documentary material to be ingested. The at least one record and/or documentary material to be ingested may be stored in a temporary storage location. That the transfer media is mounted for upload into the system may be ensured. At least one security and/or integrity check may be performed on the transfer media. At least one validation check may be performed on the at least one record's and/or documentary material's bitstream. The at least one record and/or documentary material may be stored to at least one managed storage location. Any outstanding verification issues with the transferring entity may be resolved. Necessary metadata for the at least one record's and/or documentary material's lifecycle may be persisted. Access to the at least one record and/or documentary material may be restricted on the basis of user and object attributes. The archives system may be scalable essentially without limitation. The authenticity of the plurality of records and/or documentary materials may be comprehensively storable and maintainable over an indefinite period of time in a substantially obsolescence-proof manner despite changeability of the records and/or documentary materials, record and/or documentary material custody, and/or essential characteristic definitions.

It will be appreciated that these techniques may be applied to records, assets, and/or documentary materials. It also will be appreciated that documentary materials may encompass a variety of different items. For example, in certain embodiments, documentary materials may be considered a collective term for records, non-record materials, and/or personal papers, that refers to all media on which information is recorded, regardless of the nature of the medium or the method or circumstances of recording. In certain other embodiments, documentary materials may include, for example, records (e.g., temporary and/or permanent), non-record material, personal papers or artifacts that refer to all media containing recorded information, regardless of the nature of the media or the method(s) or circumstance(s) of recording. In still other embodiments, documentary materials may be comprised of electronic information on physical media or paper records that are shipped to the archives in containers (e.g. box, envelope, etc), and those documentary materials that include electronic information may be transmitted via HTTPS or SFTP and divided into virtual electronic containers by the system. This need not be a user activity, but instead may be performed by the packaging tool as an aid to optimize transmission via electronic means.

It will be appreciated that as used herein, the term "subroutine" is broad enough to encompass any suitable combination of hardware, software, and any other form of programmed logic circuitry (which itself may be any suitable combination of hardware, software, firmware, or the like) capable of accomplishing a specified function. It also will be appreciated that the above-described embodiments, and the elements thereof, may be used alone or in various combinations to realize yet further embodiments.

As described in the exemplary embodiments the system architecture and method of operation provide a means of controlling access to AIS objects by:

Restricting object access permissions to named groups, subgroups and roles (i.e., RBAC);

Further restricting object access permissions by policy rules contained in the AIS such as time of day, work process step and network address associated with subject;

Further restricting object access permissions by clearance restrictions; and

By assigning associated attributes to each object.

In some exemplary embodiments, groups may contain unlimited numbers of subgroups and the subgroups may contain subgroups and so on without limit.

In some exemplary embodiments, a common set of access permissions is assigned as attributes to groups and common permissions of groups are inherited by subgroups and or business roles associated with that group.

In some exemplary embodiments, a subset of roles within a group or subgroup may have additional access permissions (i.e., beyond the common access permissions) granted to them.

In some exemplary embodiments, subgroups and business roles may be assigned to groups and subgroups and that access permissions associated with these business roles and subgroups may further restrict but may never enhance access to AIS objects.

In some exemplary embodiments, subject attributes will include group/subgroup assignment, role, security descriptor and account status.

In some exemplary embodiments, access permissions may be restricted or enhanced based on AIS content such as source network address, time of day, account status, work process step or any other retrievable AIS data element or state.

In some exemplary embodiments, all of the previously mentioned features function in a single security domain as well as across federated security domains.

In some exemplary embodiments, sanitized information from dominant AISs may be transferred to dominated AISs via High Assurance Guards. One application of this feature is to send sanitized metadata information from dominant AISs to dominated AISs to enhance the search capabilities of dominated AISs which, by their nature, support many more users.

In some exemplary embodiments, information may be transferred from dominated AISs to dominant AISs via data diodes.

To summarize, subjects and external systems shall be given access rights to data and to the AIS services based on their identity, the roles and access rights assigned to that identity, workflow process states, and other variable information contained in or about the AIS. AIS applications and services will verify subject's right to access AIS data and system resource through the Directory Service. Authorized subject roles will be allowed access to data. Access to information containers (e.g., files) shall be constrained such that residual information cannot be accessed. Subjects will be granted permissions by assigning them to groups roles defined in the Directory Service that uses Light Directory Access Protocol (LDAP). Individual subjects will not be directly assigned permissions in the Commercial Off The Shelf (COTS) products contained in the AIS but will be assigned to groups.

Other aspects, features, and advantages of this invention will become apparent from the following detailed description when taken in conjunction with the accompanying drawings, which are a part of this disclosure and which illustrate, by way of example, principles of this invention.

DETAILED DESCRIPTION

The following description includes several examples and/or embodiments of computer-driven systems and/or methods for carrying out automated information storage, processing and/or access. In particular, one or more examples and embodiments are focused on systems and/or methods oriented specifically for use with the U.S. National Archives and Records Administration (NARA). However, it will be recognized that, while one or more portions of the present specification may be limited in application to NARA's specific requirements, most if not all of the described systems and/or methods have broader application. For example, the implementations described for storage, processing, and/or access to information (also sometimes referred to as ingest, storage, and dissemination) can also apply to any institution that requires and/or desires automated archiving and/or preservation of its information, e.g., documents, email, corporate IP/knowledge, etc. The term "institution" includes at least government agencies or entities, private companies, publicly traded corporations, universities and colleges, charitable or non-profit organizations, etc. Moreover, the term "electronic records archive" (ERA) is intended to encompass a storage, processing, and/or access archives for any institution, regardless of nature or size.

Figure 1:
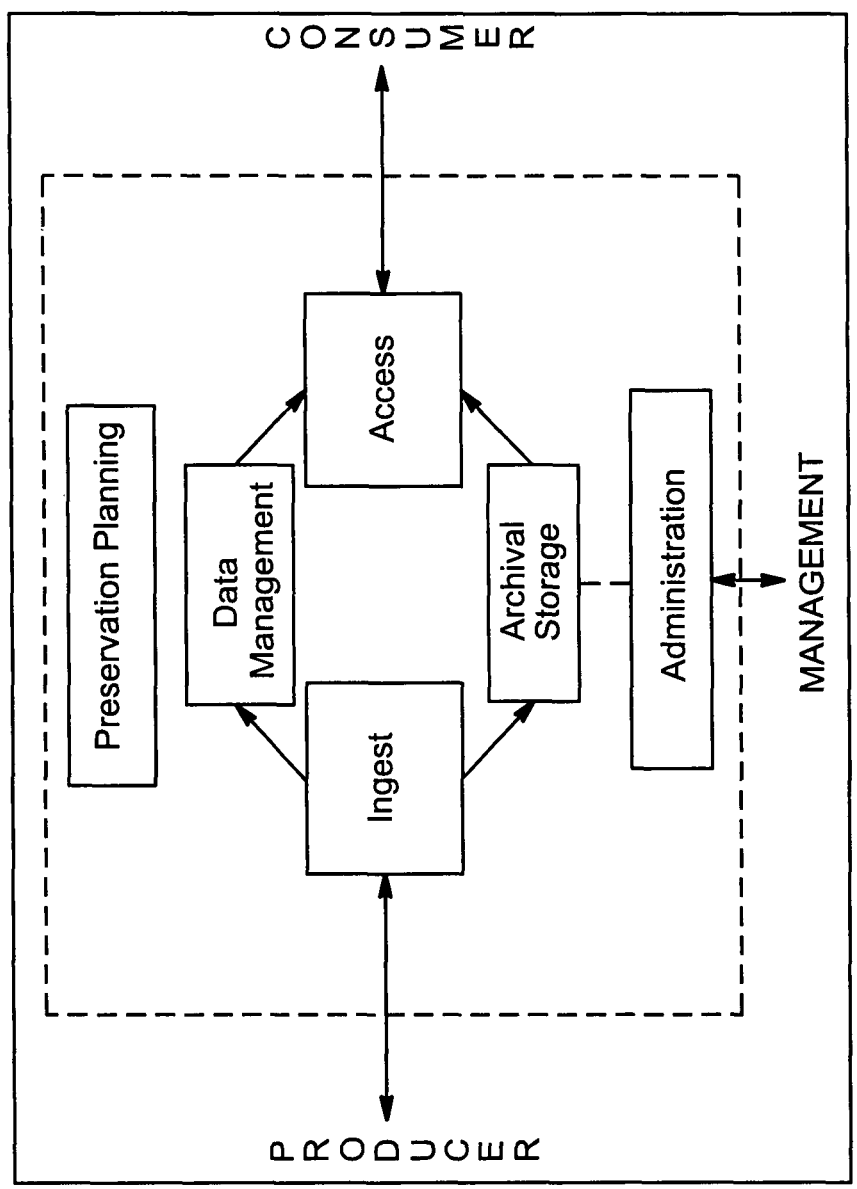
FIG. 1 is a reference model of an overall archives system.
Figure 2:
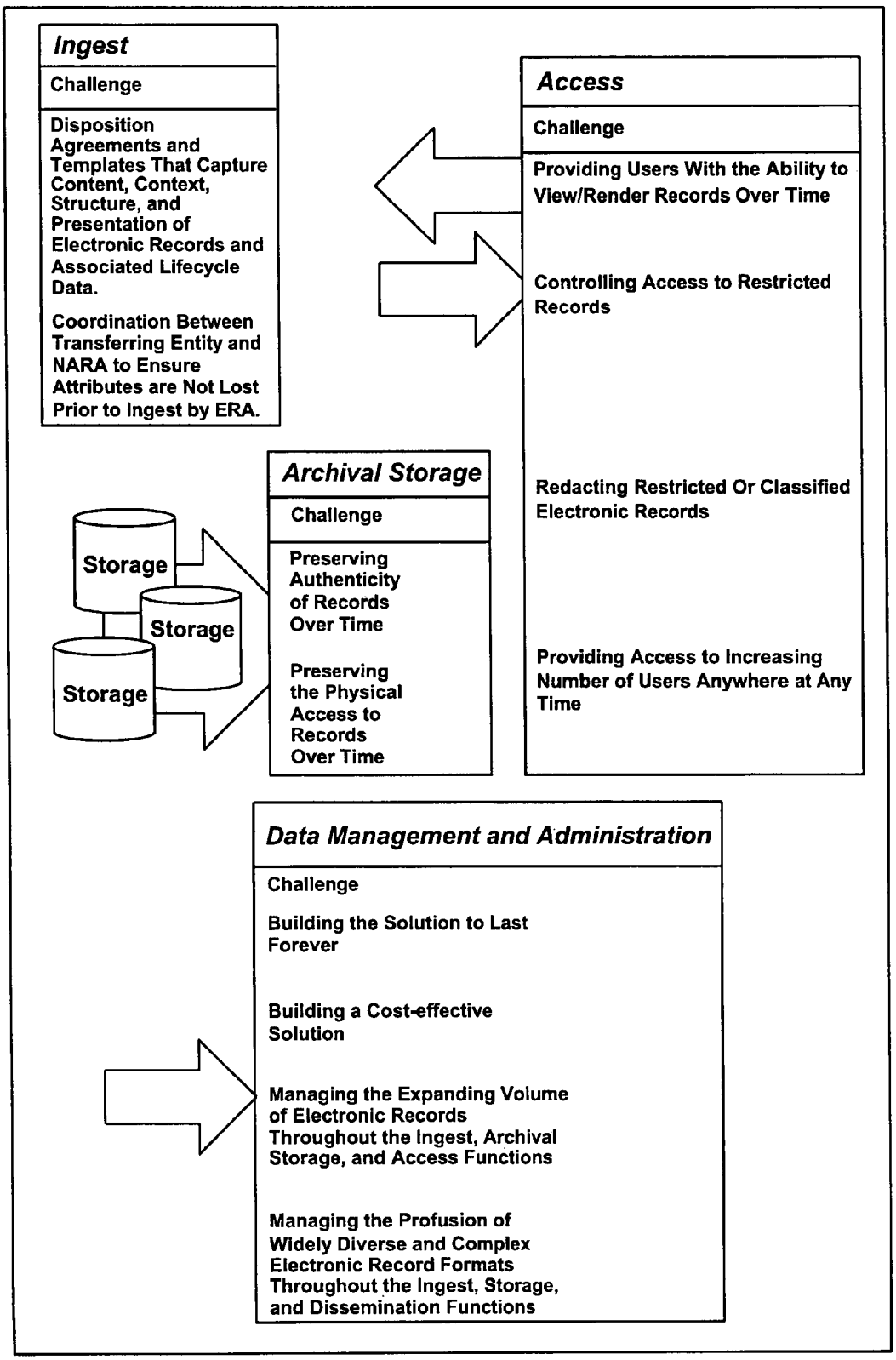
FIG. 2 is a chart demonstrating challenges and solutions related to certain illustrative aspects of the present invention.

As one example, NARA's continuing fulfillment of its mission in the area of electronic records presents new challenges and opportunities, and the embodiments described herein that relate to the ERA and/or authenticity techniques may help NARA fulfill its broadly defined mission. The underlying risk associated with failing to meet these challenges or realizing these opportunities is the loss of evidence that is essential to sustaining a government's or an institution's needs. FIG. 2 relates specific electronic records challenges to the components of the OAIS Reference Model (ingest, archival storage, access, and data management/administration), and summarizes selected relevant research areas.

At Ingest—the ERA needs to identify and capture all components of the record that are necessary for effective storage and dissemination (e.g., content, context, structure, and presentation). This can be especially challenging for records with dynamic content (e.g., websites or databases).

Archival Storage—Recognizing that in the electronic realm the logical record is independent of its media, the four illustrative attributes of the record (e.g., content, context, structure, and presentation) and their associated metadata, still must be preserved "for the life of the Republic."

Access—NARA will not fulfill its mission simply by storing electronic records of archival value. Through the ERA, these records will be used by researchers long after the associated application software, operating system, and hardware all have become obsolete. The ERA also may apply and enforce access restrictions to sensitive information while at the same time ensuring that the public interest is served by consistently removing access restrictions that are no longer required by statute or regulation.

Data Management—The amount of data that needs to be managed in the ERA can be monumental, especially in the context of government agencies like NARA. Presented herewith are embodiments that are truly scalable solutions that can address a range of needs—from a small focused Instance through large Instances. In such embodiments, the system can be scaled easily so that capacity in both storage and processing power is added when required, and not so soon that large excess capacities exist. This will allow the system to be scaled to meet demand and provide for maximum flexibility in cost and performance to the institution (e.g., NARA).

Satisfactorily maintaining authenticity through technology-based transformation and re-representation of records is extremely challenging over time. While there has been significant research about migration of electronic records and the use of persistent formats, there has been no previous attempt to create an ERA solution on the scale required by some institutions such as NARA.

Migrations are potentially loss-full transformations, so techniques are needed to detect and measure any actual loss. The system may reduce the likelihood of such loss by applying statistical sampling, based on human judgment for example, backed up with appropriate software tools, and/or institutionalized in a semi-automatic monitoring process.

Table 1 summarizes the "lessons learned" by the Applicants from experience with migrating different types of records to a Persistent Object Format (POF).

TABLE 1

| Type of record | Current Migration Possibilities |
|---|---|
| E-mail | The Dutch Testbed project has shown that e-mail can be successfully migrated to a POF. An XML-based POF was designed by Tessella as part of this work. Because e-mail messages can contain attached files in any format, an e-mail record should be preserved as a series of linked objects: the core message, including header information and message text, and related objects representing attachments. These record relationships are stored in the Record Catalog. Thus, an appropriate preservation strategy can be chosen and applied to each file, according to its type. |
| Word processing documents | Simple documents can be migrated to a POF, although document appearance can be complex and may include record characteristics. Some documents can also include other embedded documents which, like e-mail attachments, can be in any format. Documents can also contain macros that affect "behavior" and are very difficult to deal with generically. Thus, complex documents currently require an enhanced preservation strategy.<br>Adobe's Portable Document Format (PDF) often has been treated as a suitable POF for Word documents, as it preserves presentation information and content. The PDF specification is controlled by Adobe, but it is published, and PDF readers are widely available, both from Adobe and from third-parties. ISO, with assistance from NARA, has developed a standard version of PDF specifically designed for archival purposes (PDF/A, see ISO 19005-1). This format has the benefit that it forces some ambiguities in the original to be removed. However, both Adobe and Microsoft are evolving towards using native XML for their document formats. |
| Images | TIFF is a widely accepted open standard format for raster images and is a good candidate in the short to medium term for a POF. For vector images, the XML-based Scalable Vector Graphics format is an attractive option, particularly as it is a Worldwide Web Consortium (W3C) open standard. |
| Databases | The contents of a database should be converted to a POF rather than being maintained in the vendor's proprietary format. Migration of the contents of relational database tables to an XML or flat file format is relatively straightforward. However, in some cases, it is also desirable to represent and/or preserve the structure of the database. In the Dutch Digital Preservation Testbed project, this was achieved using a separate XML document to define the data types of columns, constraints (e.g., whether the data values in a column must be unique), and foreign key relationships, which define the inter-relationships between tables. The Swiss Federal Archives took a similar approach with their SIARD tool, but used SQL statements to define the database structure. |

TABLE 1-continued

| Type of record | Current Migration Possibilities |
|---|---|
| | Major database software vendors have taken different approaches to implementing the SQL "standard" and add extra non-standard features of their own. This complicates the conversion to a POF.<br>Another difficulty is the Binary Large Object (BLOB) datatype, which presents similar problems to those of e-mail attachments: any type of data can be stored in a BLOB and in many document-oriented databases, the majority of the important or relevant data may be in this form. In this case, separate preservation strategies may be applied according to the type of data held.<br>A further challenge with database preservation is that of preserving not only the data, but the way that the users created and viewed the data. In some cases this may be depend on stored queries and stored procedures forming the database; in others it may depend on external applications interacting with the database. To preserve such "executable" aspects of the database "as a system" is an area of ongoing research. |
| Records with a high degree of "behavioral" properties (e.g., virtual reality models) | For this type of record, it is difficult to separate the content from the application in which it was designed to operate. This makes these records time-consuming to migrate to any format. Emulation is one approach, but this approach is yet to be fully tested in an archival environment. Migration to a POF is another approach, and more research is required into developing templates to support this. |
| Spreadsheets | The Dutch Testbed project examined the preservation of spreadsheets and concluded that an XML-based POF was the best solution, though it did not design the POF in detail. The structured nature of spreadsheet data means that it can be mapped reliably and effectively to an XML format. This approach can account for cell contents, the majority of appearance-related issues (cell formatting, etc), and formulae used to calculate the contents of some cells.<br>The Testbed project did not address how to deal with macros: most spreadsheet software products include a scripting or programming language to allow very complex macros to be developed (e.g., Visual Basic for Applications as part of Microsoft Excel). This allows a spreadsheet file to contain a complex software application in addition to the data it holds. This is an area where further research is necessary, though it probably applies to only a small proportion of archival material. |
| Web sites | Most Web sites include documents in standardized formats (e.g., HTML). However, it should be noted that there are a number of types of HTML documents, and many Web pages will include incorrectly formed HTML that nonetheless will be correctly displayed by current browsers. The structural relationship between the different files in a web-site should be maintained. The fact that most web-sites include external as well as internal links should be managed in designing a POF for web-sites. The boundary of the domain to be archived should be defined and an approach decided on for how to deal with links to files outside of that domain.<br>Many modern web sites are actually applications where the navigation and formatting are generated dynamically from executed pages (e.g., Active Server Pages or Java Server Pages). The actual content, including the user's preferences on what content is to be presented, is managed in a database. In this case, there are no simple web pages to archive, as different users may be presented with different material at different times. This situation overlaps with our discussion above of databases and the applications which interact with them. |
| Sound and video | For audio streams, the WAV and AVI formats are the de facto standards and therefore a likely basis for POFs. For video, there are a number of MPEG formats in general use, with varying degrees of compression. While it is desirable that only lossless compression techniques are used for archiving, if a lossy compression was used in the original format it cannot be recaptured in a POF.<br>For video archives in particular, there is the potential for extremely large quantities of material. High quality uncompressed video streams can consume up to 100 GB per hour of video, so storage space is an issue for this record type. |

It is currently not possible to migrate a number of file formats in a way that will be acceptable for archival purposes. One aspect is to encourage the evolution and enhancement of third-party migration software products by providing a framework into which such commercial off-the-shelf (COTS) software products could become part of the ERA if they meet appropriate tests.

When an appropriate POF cannot be identified to reduce the chances of obsolescence, the format may need to be migrated to a non-permanent but more modern, proprietary format (this is known as Enhanced Preservation). Even POFs are not static, since they still need executable software to interpret them, and future POFs may need to be created that have less feature loss than an older format. Thus, the ERA may allow migrated files to be migrated again into a new and more robust format in the future. Through the Dutch Testbed Project, the Applicants have found that it is normally better to return to the original file(s) whenever such a re-migration occurs. Thus, when updating a record, certain exemplary embodiments may revert to an original version of the document and migrate it to a POF accordingly, whereas certain other exemplary embodiments may not be able to migrate the original document (e.g., because it is unavailable, in an unsupported format, etc.) and thus may be able to instead or in addition migrate the already-migrated file. Thus, in certain exemplary embodiments, a new version of a record may be derived from an original version of the record if it is available or, if the original is not available, the new version may be derived from any other already existing derivative version (e.g., of the original). As such, an extensible POF for certain exemplary embodiments may be provided.

In view of the above aspects of the OAIS Reference Model, the ERA may comprise an ingest module to accept a file and/or a record, a storage module to associate the file or record with information and/or instructions for disposition, and an access or dissemination module to allow selected access to the file or record. The ingest module may include structure and/or a program to create a template to capture content, context, structure, and/or presentation of the record. The storage module may include structure and/or a program to preserve authenticity of the record over time, and/or to preserve the physical access to the record or file over time. The access module may include structure or a program to provide a user with ability to view/render the record or file over time, to control access to restricted records, to redact restricted or classified records, and/or to provide access to an increasing number of users anywhere at any time.

Figure 3:
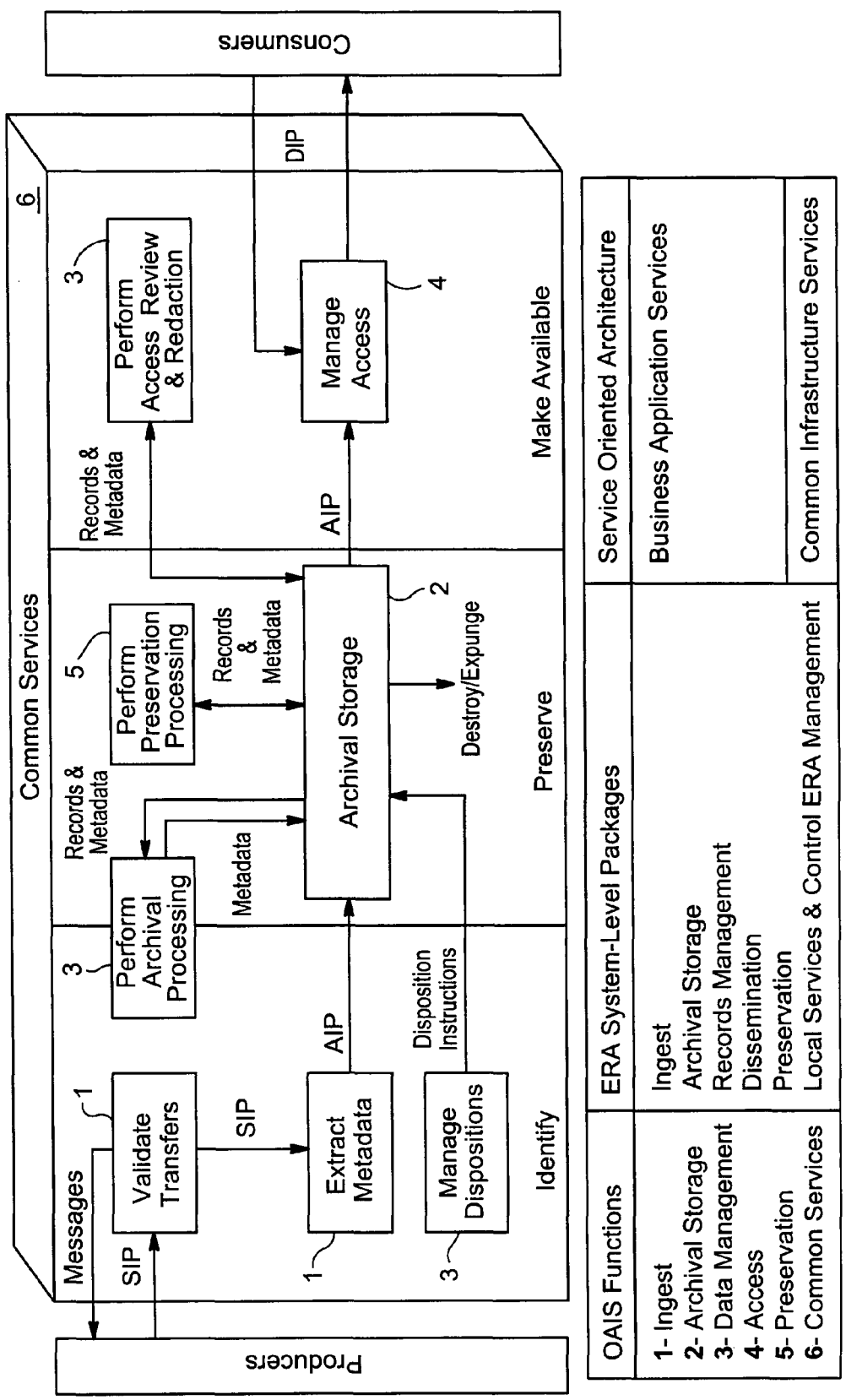
FIG. 3 illustrates the notional lifecycle of records as they move through the ERA system, in accordance with an example embodiment.

FIG. 3 illustrates the notional lifecycle of records as they move through the ERA system, in accordance with an example embodiment. Records flow from producers, who are persons or client systems that provide the information to be preserved, and end up with consumers, who are persons or client systems that interact with the ERA to find preserved information of interest and to access that information in detail. The Producer also may be a "Transferring Entity."

During the "Identify" stage, producers and archivists develop a Disposition Agreement to cover records. This Disposition Agreement contains disposition instructions, and also a related Preservation and Service Plan. Producers submit records to the ERA System in a Submission Information Package (SIP). The transfer occurs under a pre-defined Disposition Agreement and Transfer Agreement. The ERA System validates the transferred SIP by scanning for viruses, ensuring the security access restrictions are appropriate, and checking the records against templates. The ERA System informs the Producer of any potential problems, and extracts metadata (including descriptive data, described in greater detail below), creates an Archival Information Package (or AIP, also described in greater detail below), and places the AIP into Archival Storage. At any time after the AIP has been placed into Archival Storage, archivists may perform Archival Processing, which includes developing arrangement, description, finding aids, and other metadata. These tasks will be assigned to archivists based on relevant policies, business rules, and management discretion. Archival processing supplements the Preservation Description Information metadata in the archives.

At any time after the AIP has been placed into Managed Storage (also sometimes called Archival Storage), archivists may perform Preservation Processing, which includes transforming the records to authentically preserve them. Policies, business rules, Preservation and Service Plans, and management discretion will drive these tasks. Preservation processing supplements the Preservation Description Information metadata in the archives, and produces new (transformed) record versions.

With respect to the "Make Available" phase, at any time after the AIP has been placed into Archival Storage, archivists may perform Access Review and Redaction, which includes performing mediated searches, verifying the classification of records, and coordinating redaction of records where necessary. These tasks will be driven by policies, business rules, and access requests. Access Review and Redaction supplement the Preservation Description Information metadata in the archives, and produces new (redacted) record versions. Also, at any time after the AIP has been placed into Managed Storage, Consumers may search the archives to find records of interest.

Figure 4:
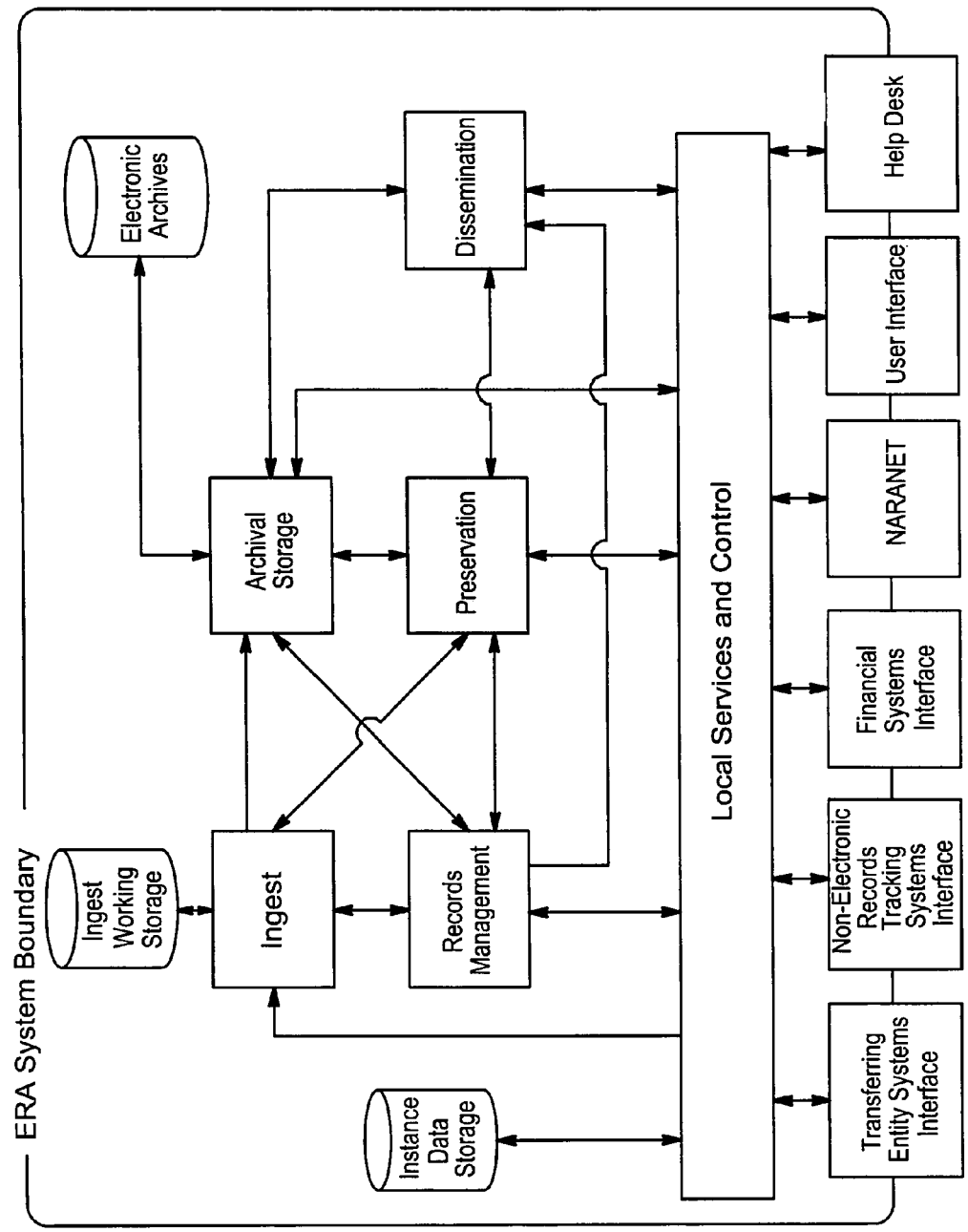
FIG. 4 illustrates the ERA System Functional Architecture from a notional perspective, delineating the system-level packages and external system entities, in accordance with an example embodiment.

FIG. 4 illustrates the ERA System Functional Architecture from a notional perspective, delineating the system-level packages and external system entities, in accordance with an exemplary embodiment. The rectangular boxes within the ERA System boundary represent the six system-level packages. The ingest system-level package includes the means and mechanisms to receive the electronic records from the transferring entities and prepares those electronic records for storage within the ERA System, while the records management system-level package includes the services necessary to manage the archival properties and attributes of the electronic records and other assets within the ERA System as well as providing the ability to create and manage new versions of those assets. Records Management includes the management functionality for disposition agreements, disposition instructions, appraisal, transfer agreements, templates, authority sources, records lifecycle data, descriptions, and arrangements. In addition, access review, redaction, selected archival management tasks for non-electronic records, such as the scheduling and appraisal functions are also included within the Records Management service.

The Preservation system-level package includes the services necessary to manage the preservation of the electronic records to ensure their continued existence, accessibility, and authenticity over time. The Preservation system-level service also provides the management functionality for preservation assessments, Preservation and Service Level plans, authenticity assessment and digital adaptation of electronic records. The Archival Storage system-level package includes the functionality to abstract the details of mass storage from the rest of the system. This abstraction allows this service to be appropriately scaled as well as allow new technology to be introduced independent of the other system-level services according to business requirements. The Dissemination system-level package includes the functionality to manage search and access requests for assets within the ERA System.

Users have the capability to generate search criteria, execute searches, view search results, and select assets for output or presentation. The architecture provides a framework to enable the use of multiple search engines offering a rich choice of searching capabilities across assets and their contents.

The Local Services and Control (LS&C) system-level package includes the functional infrastructure for the ERA Instance including a user interface portal, user workflow, security services, external interfaces to the archiving entity and other entities' systems, as well as the interfaces between ERA Instances. All external interfaces are depicted as flowing through LS&C, although the present invention is not so limited.

The ERA System contains a centralized monitoring and management capability called ERA Management. The ERA Management hardware and/or software may be located at an ERA site. The Systems Operations Center (SOC) provides the system and security administrators with access to the ERA management Virtual Local Area Network. Each SOC manages one or more Federations of Instances based on the classification of the information contained in the Federation.

Also shown are the three primary data stores for each Instance:
1. Ingest Working Storage—Contains transfers that remain until they are verified and placed into the Electronic Archives;
2. Electronic Archives—Contains all assets (e.g., disposition agreements, records, templates, descriptions, authority sources, arrangements, etc.); and
3. Instance Data Storage—Contains a performance cache of all business assets, operational data and the ERA asset catalog.

Figure 5:
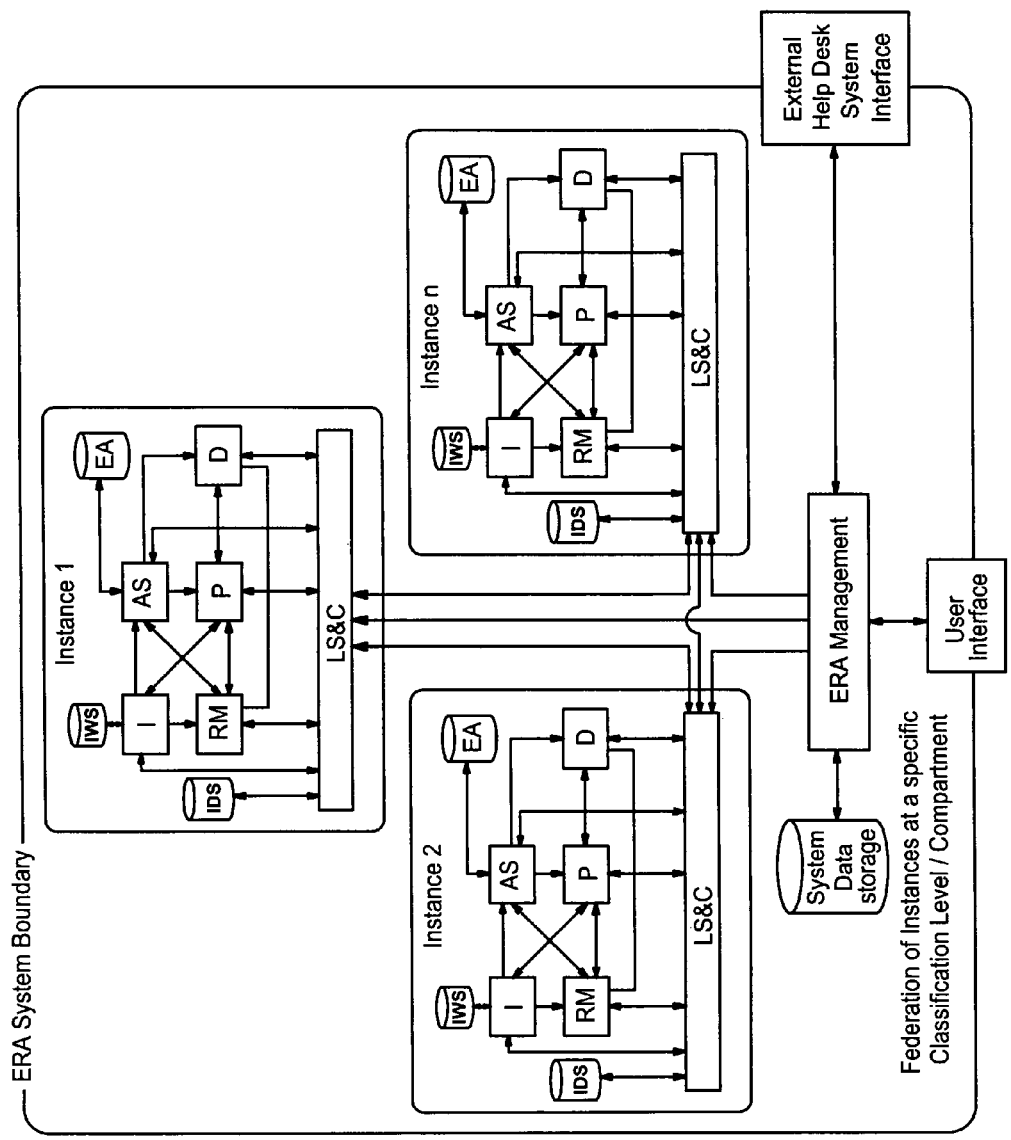
FIG. 5 is a federation of ERA instances, in accordance with an example embodiment.

The diagram, shown in FIG. 5, provides a representative illustration of how a federated ERA system can be put together, though it will be appreciated that the same is given by way of example and without limitation. Also, the diagram describes a collection of Instances at the same security classification level and compartment that can communicate electronically via a Wide Area Network (WAN) with one another, although the present invention is not so limited. For example, FIG. 5 represents a federation of ERA instances, in accordance with an exemplary embodiment. The federation approach is described in greater detail below, although it is important to note here that the ERA and/or the asset catalog may be structured to work with and/or enable a federated approach.

The ERA's components may be structured to receive, manage, and process a large number of assets and collections of assets. Because of the large number of assets and collections of assets, it would be advantageous to provide an approach that scales to accommodate the same. Beyond the storage of the assets themselves, a way of understanding, accessing, and managing the assets may be provided to add meaning and functionality to the broader ERA. To serve these and/or other ends, an asset catalog including related, enabling features may be provided.

In particular, to address the overall problems of scaling and longevity, the asset catalog and storage system federator may address the following underlying problems, alone or in various combinations:
  Capturing business objects that relate to assets that are particular to the application storing the assets (e.g., in an archiving system, such business objects may include, for example, disposition and destruction information, receipt information, legal transfer information, appraisals and archives description, etc.), with each new business use of the design potentially defining unique business objects that are needed to control its assets and execute its business processes;
  Maintaining arbitrary asset attributes to be flexible in accommodating unknown future attributes;
  a Employing asset and other identifiers that are immutable so that they remain useful indefinitely and, therefore, enable them to be referenced both within the archives and by external entities with a reduced concern for changes over time;
  Supporting search and navigation through the extreme scale and diversity of assets archived;
  Handling obsolescence of assets that develops over time;
  Accommodating redacted and other derivative versions of assets appropriate for an archives system;
  Federating (e.g., integrate independent parts to create a larger whole) multiple, potentially heterogeneous, distributed, and independent archives systems (e.g., instances) to provide a larger scale archives system;
  Supporting a distributed implementation necessary for scaling, site independence, and disaster recovery considerations where the distribution of assets and associated catalogs may change over time but remain visible to all sites;
  Employing a search architecture and catalog format that allow exploitation of multiple, possibly commercial search engines for differing asset data types and across instances of archives in a federation, as future needs may dictate;
  Accommodating multiple, heterogeneous, commercial storage subsystems among and within the instances in a federation of archives to achieve extreme scaling and adapt to changes over time;
  Supporting a variety of data handling requirements based on, for example, security level, handling restrictions and ownership, in a manner that performs well and remains manageable for an extremely large number of assets and catalog entries;
  Supporting storage of any kind of electronic asset;
  Supporting transparent data location and migration and storage subsystem upgrades/changes; and/or
  Supporting reconstruction of the catalog and archives with little or no information other than the original catalog and archived bit streams (e.g., for the purposes of disaster recovery).

It will be appreciated that these and/or other components described herein may be provided in any number of different combinations of hardware and/or software components, architectures, subsystems, or the like. Indeed, any suitable form of programmed logic circuitry including one or both of hardware and/or software may be used in certain example embodiments.

Archives System Design Considerations

Several design considerations may be taken into account when providing for authenticity of records within the broader archives system design. Design consideration may include one or more of the following exemplary considerations:
  Ability to receive reliable digital records from institutions or donors;
  As part of the templates for records, development of default authenticity requirements for different types of records;
  Use of archival judgment to assess the capability of processes that create new digital versions of record material, and presentation technologies that are used to create renditions of the records;
  Use of National Institute of Standards and Technology (NIST) approved mathematical algorithms to establish the bit-level integrity of content of digital files and provide the capability to assess the bit-level integrity of data files into the future;

Throughout the rest of the records' lifecycle after ingest, ability to produce copies of the digital record (and associated metadata) that can be used to judge the continuing authenticity of the records; and/or Functionality to attest to the authenticity of records being based on incremental development.

Of course, it will be appreciated that the same are provided by way of example and without limitation.

Both archival judgment and system processes embedded into the archives system may play a role in determining authenticity. The large volume of records may require computer-implemented methods to evaluate the conditions for authenticity of records. Human assessment may be applied to archives system processes that impact authenticity using sampled records as part of a user acceptance testing process that can serve as quality control. Computer-implemented processes may be incorporated within the archives system based on its increment-based release of functionality. These processes may codify business processes into system orchestrations and controls that are built into the system.

Templates that define the essential characteristics of record types may be developed. For example, according to NARA, a template is a set of specifications about a type of electronic document, record, donated material, or an aggregate of such electronic documentary materials. Such templates may provide flexibility and extensibility to the architecture and may also provide a mechanism for the system to evolve and adapt to changing organizational needs.

Within the lifecycle view, part of the appraisal process of electronic records may include confirming the template that should be applied to a body of material destined for the archives. The template may be updated as appropriate for the material covered by a specific schedule item. Templates also may be applicable throughout the archives system records lifecycle.

Metadata may be captured and/or generated within each activity that impacts authenticity within the records lifecycle. The archives system may have an extensible concept of metadata, which includes lifecycle data, description, and templates, that will bind templates, and contextual, descriptive, and provenance information to physical objects (e.g., data files) and conceptual objects. This metadata may be available for presentation along with records to assist in establishing their authenticity.

The archives system may incorporate the design for an Asset Catalog, which may hold an entry for every physical object (e.g., data file) and for all conceptual objects (e.g., record series, collection, etc.). The design of the asset catalog entries may save the structure of conceptual arrangements and their associated physical objects such that the structure of records is persisted. The asset catalog may provide the binding between the metadata of the record and the data files that contain records stored within the archives.

Figure 6:
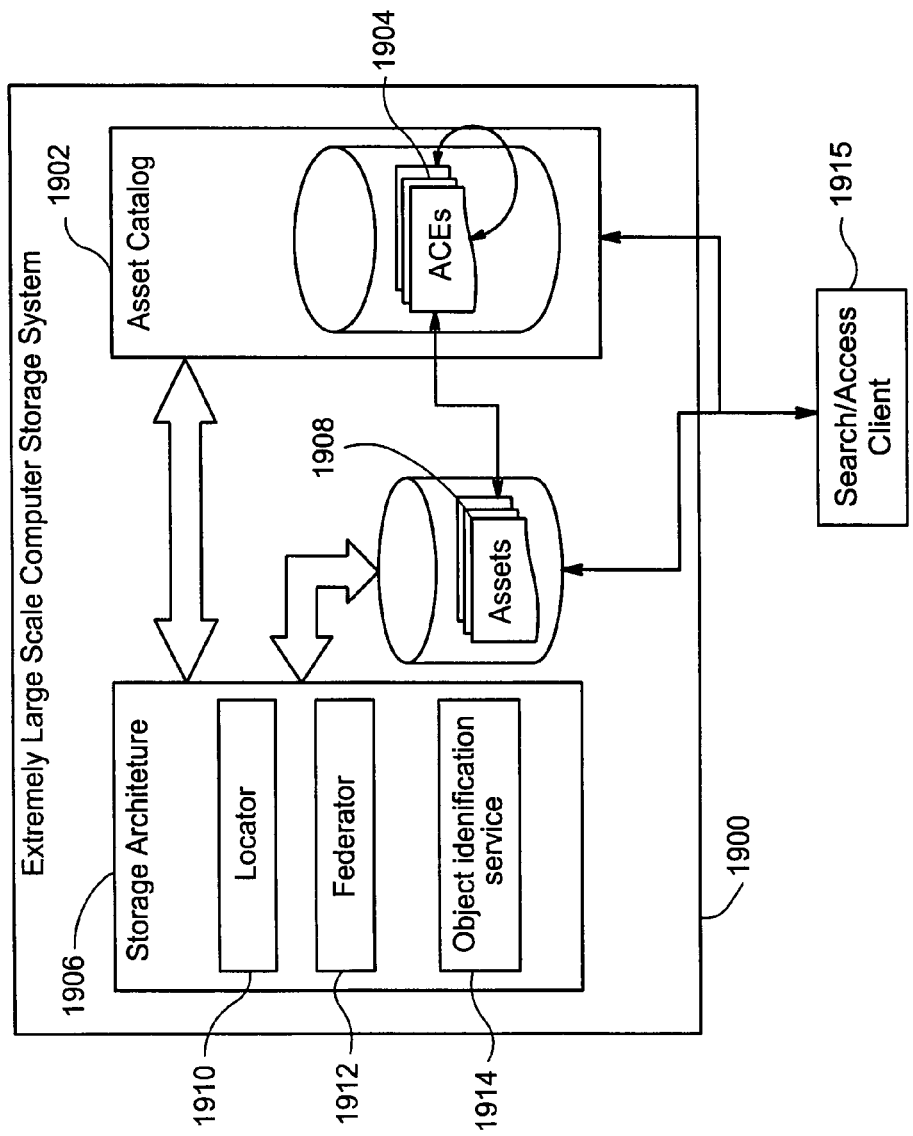
FIG. 6 is an exemplary extremely large scale computer storage system.

FIG. 6, for example, depicts a high-level overview of an illustrative system. More particularly, FIG. 6 depicts an extremely large scale computer storage system 1900 in accordance with an example embodiment. An asset catalog 1902 may comprise a plurality of asset catalog entries 1904 stored according to at least one schema and corresponding to a plurality of assets 1908. A storage architecture 1906 may be capable of storing the plurality of assets 1908, with the storage architecture 1906 comprising a storage locator 1910 and a federator 1912 (and, optionally, an object identification service 1914). An item identification scheme may be capable of providing identifiers to reference, locate, and/or access said assets 1908 and/or said asset catalog entries 1904 stored in the asset catalog 1902 in the storage architecture 1906. The computer storage system 1900 may be scalable essentially without limitation while maintaining asset storage and retrieval flexibility and substantially obsolescence-proof survivability of assets. Search/access client 1915 is also provided for providing users some level of access to stored assets. Of course, it will be appreciated that the example embodiments shown and described in connection with FIG. 9 are provided by way of example and without limitation.

A testing program helps to prove that the records archives system is reliable. The testing program may help to "close the loop" on standard business policies and procedures by proving that the system actually did was it was designed to do.

The Integration and Test (I&T) process may comprise the tasks and activities needed to build and test the archives system incrementally through different phases. The test approach may follow the same mature proven ISO 9001:2000 and Capability Maturity Model Integration (CMMI) Level 5 process. This approach may be tailored to address the unique characteristics of the archives system, including the Service Oriented Architecture (SOA), distributed deployment, external interface requirements, security requirements, human factors specifications, and/or the use of COTS products. Adherence to the processes leads to a carefully planned, disciplined, rigorous, controlled, and structured integration and test program to ensure a high quality, stable, usable system, satisfying high-level system requirements in conjunction with demanding acceptance criteria.

Figure 7:
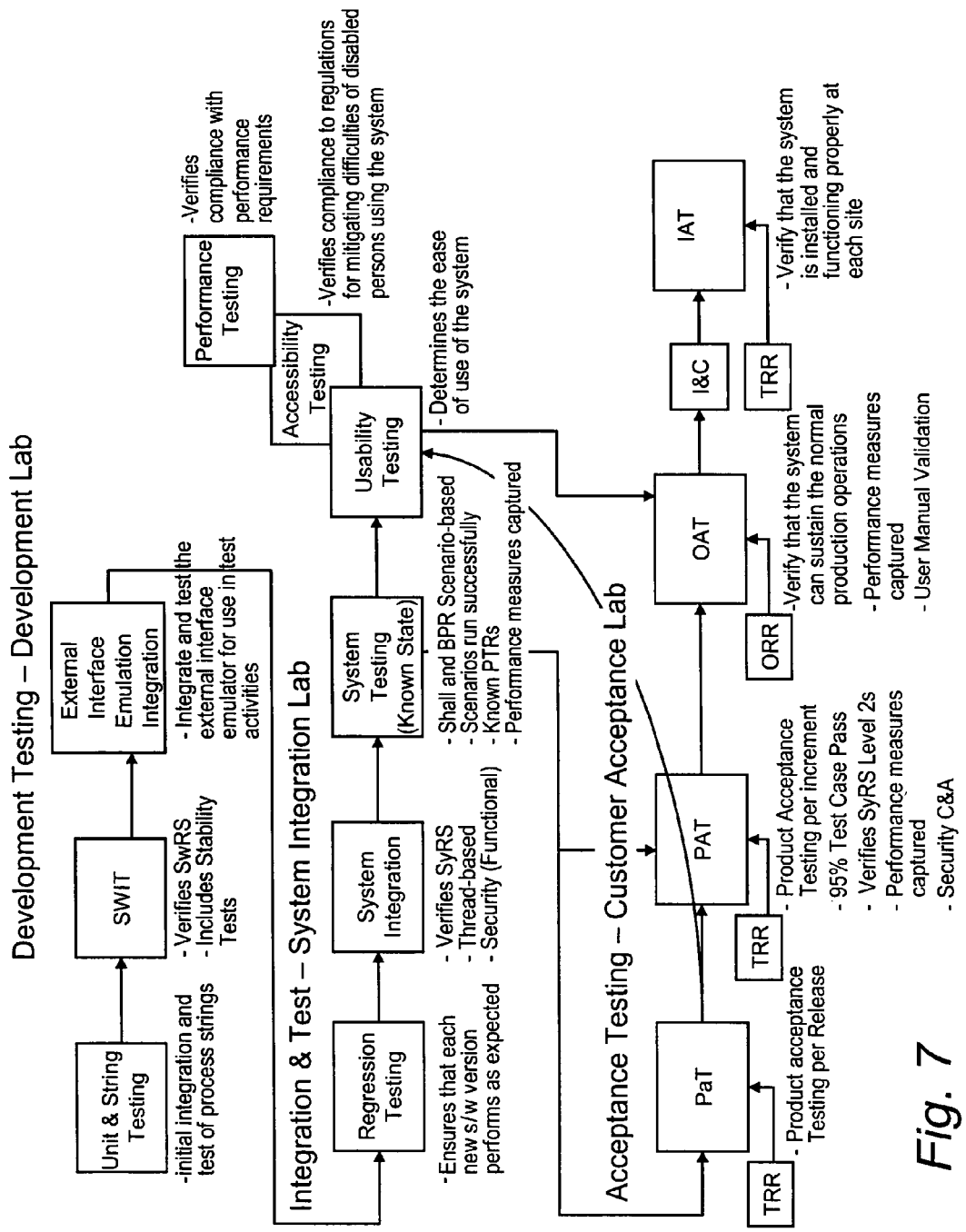
FIG. 7 helps illustrate an exemplary integration and test lifecycle.

I&T activities may starts with development testing at the archives system development lab that includes: unit and string testing, software integration testing, and external interface emulation and integration. The next step is system integration testing that is conducted at a facility that mirrors the archives system in production. This includes regression testing, system integration, system testing, usability testing, accessibility testing, and performance testing. The final set of testing is known as acceptance testing and this is done within a customer acceptance test lab that includes product acceptance testing on a release and increment basis, operational acceptance testing and installation acceptance testing. FIG. 7 depicts this illustrative Integration & Test Lifecycle.

One purpose of the I&T Lifecycle is to verify and validate the archives system. Within this context, verification refers to the activities performed to ensure that the system that was built accurately reflects the intent of the system requirements, e.g., it provides confirmation that the correct system was built. Validation activities confirm that the system that was built functions as intended, e.g., the system performs activities correctly and returns the expected results. These activities are performed on many levels (unit, software, system) and from different perspectives (human factors, security, and performance).

Execution of the I&T Lifecycle may help to ensure authenticity by verifying that the pillars of the archives system support structure for authenticity mentioned above have been incorporated the software and system requirements that codify this functionality. Test procedures and test cases incorporate elements to demonstrate that the specified functionality has been built, is available to authorized users, and functions as intended. Although the archives system credibility and the necessary conditions for authenticity can be verified and validated, the determination of the authenticity of a record still requires the application of archival judgment via one or more predetermined standards. Implementation of these standards will establish the archives system's ability to preserve authentic records.

Standard business processes, which utilize the preservation of authentic records as its fundamental precept, may serve as the foundation to establishing the authenticity of the records within the archives system. Therefore, end-to-end testing may be performed to establish the archives system's ability to support standard business processes. End-to-End testing may be conducted at the end of each increment. It may be comprised of a series of regression tests and system level scenarios developed in conjunction with subject matter experts (SME) and based on the output of the Business Process IPT. Each scenario may contain a mapping of the steps to the conditions necessary for authenticity and therefore prove that authenticity has been built into the system and that the system can produce authentic records.

As used herein, the term "asset" may include any electronic (e.g., digital) information archived in an archives system, and the term "electronic record" may include a single conceptual object, which may be comprised of multiple files, that is made or received by an organization or institution. An electronic record is a type of electronic asset. A non-record asset may be information about or derived from records. Authenticity applies to records, though elements of authenticity, such as integrity, apply to all assets.

Certain example embodiments establish and/or maintain the authenticity of records stored in an electronic archives system. The example systems and methods generally may provide a comprehensive set of processes that achieve new, higher levels of authenticity standards. One aspect of authenticity relates to provenance, as described above, refers to the origin or source from which something comes along with the history of subsequent owners (e.g., the chain of custody). Provenance is a fundamental principle of archives in general, referring to the individual, group, or organization that created or received the items, e.g., in a collection. Another aspect of authenticity involves the Essential Characteristics of an electronic record and, as described above, Essential Characteristics include those properties and/or characteristics of electronic records that must remain unchanged through transfer, ingest, storage and presentation or output of records (including preservation processing). A record's essential characteristics should remain unchanged so that there is no loss of the information content of the asset providing archival value, which may be needed for authenticity judgment.

Essential characteristic parameters may be defined by record type. It will be appreciated that essential characteristics of assets may change over time for a given record type if it becomes apparent in the future that some characteristic should have been captured or captured at a different standard, for example. To deal with this problem, either the original formats have to be interpretable forever, which means having to maintain an ever expanding capability (e.g., number of software applications) ready to interpret every format ever archived, or else original formats have to be adapted to modern, supported formats from time to time, which risks losing unforeseen essential characteristics if these adaptations cannot be lossless and inadvertently lose information needed for a characteristic subsequently determined to be essential. Certain example embodiments support both approaches and allow for a trade-off between these two approaches.

In certain example embodiments, a flexible set of processes and interfaces, enforced through workflow and computer-implemented sub-processes, may be combined to create a mechanism that meets a higher standard of electronic records authenticity and which can be used to archive other institutions' electronic records as well as an institution's own. For example, the processes may be flexible in that they accommodate various situations that may arise, e.g., if the originator of the materials to archive no longer exists (e.g., a defunct business) then not all information about the records may be available.

Some or all of these sub-processes may combine to provide new levels of authenticity in an archives system by providing the elements an archivist needs to make a judgment of authenticity over the life of the record, including, for example, ensuring asset integrity, establishing assets' essential characteristics, and providing provenance.

These elements are provided by the following exemplary general workflow. First, records and other associated electronic assets may be safeguarded through their lifecycles. This may include providing mechanisms to manage aspects of intended asset changes (e.g., record adaptations) and status, and also detecting unintended changes to assets (e.g., through file integrity seal checks). Second, associated context and structure may be extracted and preserved so that the meaning of the records is known and their essential characteristics are defined and recorded, including, for example, organizing records so that those created or received by one records keeping unit are not intermixed with those of any other, as may be necessary. Third, uninterrupted proof of custody may be maintained beginning as soon as possible (e.g., establishing and preserving proof of the records' source) and for the life of the record. Fourth, mechanisms may be established for defining and capturing the essential characteristics of archived records, and for preserving these characteristics in records as they may be adapted over the years from obsolete formats to new formats.

The example workflow process described above may be used in connection with one or more of the following example sub-processes. In general, the sub-processes (or subroutines) correspond to acquiring records processes, ongoing processes, and horizontal functions. It will be appreciated that the following sub-processes may be made available via any suitable form of programmed logic circuitry.

Records scheduling programmed logic circuitry generally establishes the records to archive and collects information about the records. Such records scheduling programmed logic circuitry may help to identify which records are permanent and will be transferred to an archives. It also may collect available initial information about the electronic records to be archived to plan their preservation and begin to establish their authenticity (e.g., the early collection of contextual information to establish chain of custody as early as possible thereby increasing authenticity). Information collected may include disposition (e.g., retention time), purpose, and context (e.g., structure, any existing appraisals, administrative and custodial history), such as may exist. Early collection of contextual information is part of bringing forward in the record lifecycle certain elements of the archives processes to establish chain of custody as early as possible, thereby increasing authenticity.

Preservation planning programmed logic circuitry may be provided. Such preservation planning programmed logic circuitry may be useful to establish the essential characteristics of records that must persist over time. Scheduled records' essential characteristics should be preserved throughout the archival process regardless of whether methods to protect these characteristics exist. Transfer request programmed logic circuitry relates to a step in the legal transfer of records during which time additional detailed information may be collected. Such transfer request programmed logic circuitry may establishes an agreement to transfer physical and/or legal custody of documentary materials, either for archival or records center storage. It also may establish a standard record of the transfer request at the point when certain details of the transfer are known, supporting subsequent verification.

Package creation programmed logic circuitry may facilitate flexible package creation, during which time additional attributes may be collected. Such package creation programmed logic circuitry may help to package records and associated information, e.g., documentary materials and additional metadata, for transfer to the archival system. Metadata may include number of files, filenames and attributes, who created, when created, how created, structure, description, purpose, etc., at the source institution so as to establish chain of custody as early as possible. Package creation also may involve a packaging tool that operates in connected or disconnected mode. In certain example embodiments, a connected mode may be more automated, whereas a disconnected mode may provide more flexibility.

Transfer programmed logic circuitry may provide for the secure transmission of the electronic records to the archival system. This may include documentary materials and transfer manifest.

Ingest extraction programmed logic circuitry may help to collect metadata from transferred materials including essential characteristics. Such ingest extraction programmed logic circuitry may provide for the unpackaging of transmitted packages to access the individual files in the package and associated metadata. This may include extracting certain metadata about the records' files, which may further include extracting essential characteristics according to asset type templates to capture the currently established essential characteristics for an asset type while still accommodating the capture of new or unique characteristics that may be identified for the transmitted assets. Ingest scanning programmed logic circuitry may check for malware (e.g., viruses) and security classifications. Ingest validation programmed logic circuitry may provide a comprehensive validation process that includes checks that records are in accordance with previous steps. Such ingest validation programmed logic circuitry may initiate a multi-level set of checks that ensure the package received is not corrupt and is in accordance with records of what is supposed to be transferred (e.g., according to business objects, such as transfer agreements, records schedules, transfer manifests, legal transferences, and/or disposition agreements). Ingest assignment of unique ID programmed logic circuitry may assign an immutable, globally-unique identifier to each asset so that it can be tracked and managed over time without any identification ambiguity. Ingest integrity sealing programmed logic circuitry may help to ensure that asset corruption is detected. Such ingest integrity sealing programmed logic circuitry may help to derive a unique hash (e.g., number) for each record and/or for each file of each record based on the content of the record and/or file. The hash does not need to (and, in certain example embodiments, should not) change over the life of the record, and may be used to prove the record has not changed over its life. This process may be performed as soon as packaging occurs. The seal (e.g., hash numbers) may be stored separate from asset (e.g., in the asset catalog) for protection. New record versions may receive their own seal and may have different underlying files, but the original record, including its files, always should be retained.

Preservation storage programmed logic circuitry helps to ensure that records are stored according to handling restrictions and that access controls are in place. That is, assets are stored (e.g., "bit streams" are preserved) in accordance with any handling restrictions, and associated catalog entries are created, capturing essential information used for authenticity, e.g., for tracking the archives contents and capturing essential characteristic values and access and handling controls. This may provide protection of assets in accordance with security and privacy rules, preserve assets in accordance with their dispositions (e.g., retention times), including protection from premature deletion, may provide for adaptation to new versions as electronic formats become obsolete, and eventually delete or purge according to asset's disposition and with appropriate safeguards to ensuring purging is still valid.

Access control programmed logic circuitry serves to restrict access to records in accordance with user attributes and object attributes. That is, only users having clearance or access level and/or ownership indicia or work relationship to particular records may in fact obtain access to the particular records. In this way the security of sensitive and confidential records can be preserved thereby preventing unfettered dissemination of records in violation of privacy rules, national security, etc.

Accommodations may be made for ongoing authenticity judgment processes. Such accommodations may include, for example, workflows to automate and/or enforce authenticity judgment processes, the checking of integrity seals, reporting on chain of custody data, asset activity logs, and other data, all for the purpose of supporting subsequent and ongoing integrity checks and archivists' viewing of this information for authenticity judgment purposes.

Accommodations also may be made for ongoing preservation and dissemination of assets. Such accommodations may include, for example, identifying, capturing, and implementing security, privacy and handling restrictions, including information assurance mechanisms (e.g., authentication and identification, confidentiality, integrity, and non-repudiation), search metadata, and records' essential characteristic values, to support subsequent asset preservation and dissemination. For preservation, this may include accommodation for establishing new certified digital adaptations of assets, e.g., modern asset formats that maintain essential characteristics, which may include matching assets to digital adapters according to measures based on essential characteristics, to derive modern formats of assets before they become obsolete, and other asset versions, such as redacted assets. Dissemination aspects may support authenticity, for example, by protecting assets, by accurately and completely rendering assets, and by providing "findability" to ensure that any records competing for authenticity can be known to the archivist to make a proper authenticity judgment. Also, ongoing preservation processes may implement mechanisms to avert obsolescence by migrating assets to modern formats without jeopardizing authenticity.

Information assurance controls may be provided throughout all processes and on all interfaces. In particular, all interactions (e.g., transfer) with respect to the archives system may include information assurance controls (e.g., may include two-factor authentication with external institutions and access controls internally) in accordance with security and privacy rules. Also, all actions on assets may be tracked and made available for authenticity judgment purposes. That is, all activities performed on assets may be logged to support subsequent reporting in support of provenance. Log data may be added to archival storage as an asset. Log record search keys may be added as metadata for the corresponding assets in archival storage or individual log records may be added as assets in their own right and explicitly linked to corresponding assets via the mechanisms of the asset catalog.

Certain exemplary embodiments provide for a more comprehensive asset lifecycle, governance, controls, and tracking, while also providing for a higher degree of authenticity assurance. Additional interfaces (such as the packaging tool noted earlier) and processes for receiving assets into the archives from external legal enterprises, e.g., separate agencies and businesses also may be provided. It will be appreciated that certain example embodiments extend the meaning of provenance to include not only the origin of the records and/or data files and their custodial history, but also the history of all actions taken on those records and/or data files within the records archives system. This may provide additional flexibility as policies on how to establish authenticity change over time by providing additional information that can be exploited by such policies.

The exemplary embodiments described herein implement a flexible and extensible means of controlling access to Automated Information System (AIS) objects (e.g., data records, software programs, AIS files, software program functions) based on subject (i.e., user) attributes (e.g., group affiliation, business role, clearance or access level and network address from which access is requested) and object attributes (e.g., required clearance level, group ownership and state (e.g., workflow step and time of day)). The invention functions both within a single security domain as well as across a federation of security domains.

A record may be composed of a large number of separate digital objects each of which may have its own access restrictions some of which may be specific to, and created for, those digital objects. This implies a record may be subject to an unbounded set of access restrictions that may be placed on the record or at any point in the hierarchical organizations of the objects that make up that record.

Because access restrictions are an unbounded set defined by the record, and can be policy-driven, classic access restriction models, which are built around a pre-determined finite set of restrictions may be inapplicable to this model.

The exemplary embodiments posit a different record-centric model that is extensible in terms of specific access privileges and includes both functional roles and security locales.

Managing access to material in the AIS raises new issues that it may not be possible to address within the context of a classic access-restrictions defined centric model in which access restrictions are defined in advance.

Because of the unbounded nature of the access and use restrictions for material in the AIS, a model that is extensible is needed. This has implication of course both for the labeling of access and use restrictions and for the authorization process for entities accessing the material.

The exemplary embodiments implement the use of Extensible Markup Language (XML) to create an extensible means to define access and use restrictions to objects. Lightweight Directory Access Protocol (LDAP) subject (i.e., user account) attributes provide an extensible means of recording subject groups, roles, clearances and other privileges in LDAP Data Interchange Format (LDIF). Comparison of pertinent subject and object attributes determine whether or not access is granted.

The traditional approach to managing access restrictions on information has been restriction-centric and has operated like this:

Define the restrictions;
Assign the material to the defined restrictions, i.e. classify it; and then
Assign users access privileges that map to the access restrictions.

Given a finite set of pre-defined access restrictions it becomes straightforward to assign an access privilege to a user, either individually or as a member of a group, and compare that privilege to the access restriction of the material the user has requested. This is true of National Security Classifications and associated security clearance levels (i.e., Confidential, Secret and Top Secret).

Some access restrictions, such as National Security Classifications or the Office of Personnel Management's Levels of Public Trust may be a single axis hierarchy in which each access privilege level includes all levels below it. In more complex systems the hierarchical axis may be combined with a second, non-hierarchical axis (e.g., Sensitive Compartmented Information (SCI)) that may be based on some other criteria such as the subject category of the material. In this case, user privileges and access restrictions have to be evaluated on both axes (i.e., classification and compartment or trust level and subject-matter). More than one "compartment" may be attributed to both users and objects.

From an access control perspective the compartments of SCI function in the same way that other government access controls such as Title 13, Census information, Law Enforcement Sensitive, or Health Insurance Portability and Accountability Act (HIPAA) function. Commercial industry controls access to information protected by the Privacy Act, HIPPA, Intellectual Property laws and Export Laws in the same way and may extend this methodology to other information it deems to need protection.

The manner in which records are transferred to an organization and the latitude donors have in defining access and use restrictions on records they donate or entrust to the receiving organization, introduces concepts such as "potentially restricted" records, special access restrictions and use restrictions that are unbounded in scope. Table 2 identifies types of access and user restrictions.

TABLE 2

| Restriction | Description | Implication |
| --- | --- | --- |
| Undetermined | There has been no determination as yet whether the record is access or use restricted | Only persons with a specific role within an organization, and security clearance or perceived level of trustworthiness for any class of material that may be contained in the record or can search or access the record |
| Potentially Restricted | The transferring agency (or a NARA appraiser, or the ERA ingest process) indicate there may be access-restricted material in the record | Only persons with a specific role within the organization and sufficient security clearance or perceived level of trust for any class of material that may be in the |

TABLE 2-continued

| Restriction | Description | Implication |
|---|---|---|
| | | record can search or access the record |
| Access Restricted/Access Restricted & Compartmentalized National Security Classification | The record has been classified (i.e., by National Security Classification) or has been categorized by some other governmental or commercial hierarchical access control methodology and may be compartmentalized or otherwise restricted to groups requiring access to compartments/subject categories of information. | Only persons or connections (networks) with appropriate security clearance/perceived level of trust and privileges for the compartment or other category of information can search or access the record. |
| Access Restricted/Specific Access Restriction | A donor through a deed of gift, a transferring agency, or the organization, has placed record-specific access restrictions on the record. The definition of these is unbounded. A record may have "n" number of specific access restrictions that are not hierarchically related to one another. | Only persons with "n" privileges defined in a manner specific to the record can search or access the record |
| Use Restrictions | These appear to be unbounded in terms of definition and any number may apply simultaneously. They are not based on user privilege. Presumably they apply to every release of the record (output or export) outside the organization | The organization has to make some sort of "best effort" to ensure materials are only released according to the intentions of the use restriction |
| Unrestricted | The record has no access restrictions | The AIS makes the record available to anyone |

To apply such restrictions implies knowing the following characteristics of entities wishing to access material covered by these restrictions:

Role: What functional role do they have in this session? This will determine what types of activities they can perform (which processes or services within a process they can execute). Role may sometime be hierarchical (that is the role may have all the privileges of itself and any subsidiary roles) or not.

National Security Classification: What clearance and compartmental access permissions do they have? Additionally, as applied to Sensitive But Unclassified records, what access permissions/clearances have been granted (e.g., Title 13 (census) data, Law Enforcement Sensitive, Privacy Act protected information, Health Insurance Portability and Accountability Act (HIPAA) protected information).

Non-National Security Classification: What OPM or commercial trust level do they have? What, access permissions/clearances have been granted (e.g., Title 13 (census) data, Law Enforcement Sensitive, Privacy Act protected information, Health Insurance Portability and Accountability Act (HIPAA) protected information)?

Specific Access Privileges: What specific access privileges do they have, within the scope of those defined by the record? There may be "n" number of specific access privileges. They may be hierarchical. Compartmentalized information would be an example of one type of specific access privilege. Again, these have to map to the specific access privileges defined by the record.

Locale Security Classification: What categories of access restricted data, including search results, can be communicated to the locale where the user is. This may include the network(s) the data will be carried on, the legal jurisdiction(s) to which it will be transported, etc. In other words, I may have been granted access to the organizations business plans or financial information but may not be allowed to access it via a wireless communication connection at a local coffee emporium.

Use Restrictions Has the user committed to some sort of covenant in regard to respecting use restrictions?

EXAMPLE 1

The family of a prominent scientist who worked on projects of national interest deeds the scientist's papers to the National Archives. The deed of gift stipulates that for some of the papers only persons deemed to have made a recognized contribution to the field of research (energy/particle physics) should have access and that publication of any part of the papers is prohibited.

In the Ingest process, the Department of Energy (DOE) is consulted because the scientist worked on DOE projects and some of the papers may be access restricted by the DOE. DOE classifies parts of the papers as Secret and further restricts some parts of the donation to persons authorized to access the records of the project on which the scientist worked.

The Archivist has determined that the original order of the record looks something like the following. This represents the way the scientist had organized his papers.

```
Curie Collection
    Family Papers
    Professional Papers
        Teaching Activities
        Research Activities
            Biophysics
            Particle Energies
                Published papers
                Unpublished work
                    DOE Project XYZ
                    UNYC graduate fellows
        Professional Associations
```

A researcher submits a Freedom of Information Act (FOIA) request against this collection. The access restrictions on the part of the record subject to the FOIA request and of interest to the DOE Reviewer, which is an unpublished work for the DOE project, might look like this:

The Globally Unique Identifier (GUID) of the object is:

```
\CurieCollection\ProfessionalPapers\ResearchActivities
\ParticleEnergies\UnpublishedWork\DOEProjectXYZ
\DocumentABC.txt
```

Example extract of archival metadata of the above:
The Access management processing creates a list of the privileges of the user:

```
TS/
DOE/
CurieCollection/
    then compares those with the access restrictions on the object:
    TS/S
        DOE/ProjectA/Research
```

In this case the user has sufficient privileges (and need to know) in both of the access restriction hierarchies associated to the object:

User has a National Security Classification of TS/ which is higher than the required privilege of TS/S, User has a DOE/ privilege, which encompasses the DOE/ProjectXYZ/Research restriction The user has additional privileges on the entire CurieCollection/ access hierarchy but these are not required for the object being accessed.

Further access processing would check (1) to make sure the user locale had sufficient privilege for any National Security Classification associated to the object before initiating a transfer of the object to the user's location and (2) if there are any use restriction entries on file the system would check that the user had a commitment on file to respect those use restrictions.

Domain Definition: A security domain is defined as an instance of the AIS that contains information a given hierarchical sensitivity level (e.g., National Security Classification: Top Secret, Secret, Confidential, Unclassified) or lower. The sensitivity level may be further defined by multiple non-hierarchical attributes such as SCI compartments. Dominance does not apply to non-hierarchical domains. For example, a Secret domain could contain information classified as Secret, Confidential or Unclassified but could not contain Top Secret information. A Top Secret/SCI domain could contain all sensitivity levels.

Applying this to the commercial world a corporation might define its information sensitivity as High, Medium, Low and Unrestricted. Employees, partners etc. would be subject to investigations, interviews or other processes to determine their trustworthiness (High, Medium, or Low) in protecting information. The sensitivity level might further be defined by multiple non-hierarchical attributes such as Product X-ray, Corp. Y Merger, ABC Division Divestiture.

Federation Definition: A security federation is any number of interconnected instances of a security domain. For example, a primary Secret domain in the Washington, D.C. area when connected to a Secret instance at a regional office in St. Louis, Mo. or Stennis, Miss. would form a Secret Federation. There is no limit on the number of domains/instances that comprise a federation. Likewise a commercial entity might create separate systems and communications networks, Virtual Private Networks, or Virtual LANs to be used for High, Medium, Low and Unrestricted work. Several instances of the High systems would be referred to as the High Federation.

Dominate Definition: One security domain dominates another if and only if the hierarchical part of sensitivity level of the first is higher than that of the other. The concept of dominance also applies to the clearances of subjects. For example a subject with a Secret clearance may be given access to Secret, Confidential and Unclassified domains but not Top Secret domains. Information may flow freely from a dominated domain to a dominant domain but not vice versa. Dominance does not apply to non-hierarchical access controls. For example, a subject with SCI access does not necessarily have access to Unclassified Title 13 or Presidential Records Act information. In the commercial environment an individual with High clearance does not necessarily have access to Product Xray information.

The security infrastructure must support operation of the security domain as an independent system as well as part of a federation where some domains dominate others. The structure must support the receipt of catalogue entries into a dominated domain with the proper definitions and protect them in its domain appropriately. It must also allow receipt of information from domains that it dominates.

The AIS implements a new record-centric model for managing access and use restrictions that is extensible in terms of specific access privileges and includes both functional roles and security locales.

This record-centric model allows any number of access restrictions to be placed on a record, or any part of a record via metadata entries for the record.

The access restrictions can be modeled in a simple syntax that allows for the possibility of hierarchical restrictions. Extensible Markup Language (XML) is well-suited for this and was used in the AIS, though the following XML examples represent examples that could be modeled using other technologies. The access restrictions, as represented in XML metadata, can be associated with any part of a record within that record's own internal hierarchical organization.

The application of such restrictions requires that when a user is authenticated and authorized, a session context is created which will include the access privileges from that user's profile, and user locale data.

EXAMPLE 2

The family of a prominent scientist who worked on projects of national interest deeds the scientist's papers to the National Archives. The deed of gift stipulates that for some of the papers only persons deemed to have made a recognized contribution to the field of research (energy/particle physics) should have access and that publication of any part of the papers is prohibited.

In the Ingest process, the Department of Energy (DOE) is consulted because the scientist worked on DOE projects and some of the papers may be access restricted by the DOE. DOE classifies parts of the papers as Secret and further restricts some parts of the donation to persons authorized to access the records of the project on which the scientist worked.

The Archivist has determined that the original order of the record looks something like the following. This represents the way the scientist had organized his papers.

```
Curie Collection
    Family Papers
    Professional Papers
        Teaching Activities
        Research Activities
            Biophysics
            Particle Energies
                Published papers
                Unpublished work
                    DOE Project XYZ
                    UNYC graduate fellows
    Professional Associations
```

Subjects (subjects and external systems) are given access rights to data and to the AIS services based on their identity, the Groups to which they belong and their roles. Access rights are dynamically assigned to an identity during identification and authentication. AIS applications and services verify subject's right to access AIS data and system resources through the Directory Service. Authorized subject roles are allowed access to data. Access to information containers (e.g., files) is constrained such that residual information cannot be accessed. Subjects are granted permissions by assigning them to group roles defined in the LDAP Directory Service. Individual subjects will not be directly assigned permissions in the Commercial Off The Shelf (COTS) products contained in the AIS but will be assigned to groups. Following are definitions of terms:

Group. A logical set of subjects (e.g., within a given organization) with common or collaborative functions or interests. This grouping can be based on organizational attributes with limited privileges assigned to a group. A group will always be associated with one or more roles. All members of the group will have a common set of privileges inherited as a member of the group. A subset of the group containing one or more roles may have additional privileges that are not allocated to the group in common. These may be administrative privileges to assign members, write or change the status of business objects for which the group has access. Groups can contain individual roles and subgroups, or roles which inherit all the roles of the parent group. Groups are the primary means of granting permissions to subjects for AIS COTS products that do not recognize centrally managed roles (e.g., Documentum, Remedy, Intellitactics). Group permissions are defined within the COTS product. These groups will be synchronized with the LDAP directory to maintain consistency between the tool and the impacted COTS products.

Role. A named logical set of access permissions assigned to an AIS job function with specified permissions. Equivalently, a named set of subjects with a given job function such as record scheduler, transfer staff with specified permissions. Roles and the associated permissions will be controlled through business and security policy. The permissions assigned to a role by policy represent the actions that may be performed by someone in that job function such as edit their own disposition agreements but not those belonging to others. A group will always be associated with one or more roles. A role may exist without being part of a group. From a business standpoint, roles and groups give us two different ways to think about sets of people: in terms of the organizational groups they belong to, and in terms of the job functions they perform. From a technical standpoint, roles and groups may have different lookup performance characteristics (role lookup is faster), roles can be conditional on other attributes such as time of day (e.g., the permissions of a role are valid only during business hours), and roles generally cannot contain other roles (while groups can). In the AIS, roles (not groups) will be the primary means of assigning permissions to subjects for custom applications, but groups will be the primary means of assigning permissions to subjects for COTS applications that do not recognize roles.

Filtered Role. A group of subjects that are assigned a named role by filtering on one or more subject attributes (e.g., organization or account status).

Policy (in COTS Policy Manager). A named set of permissions/rules applied to a set of identities under given conditions.

The central Directory Service is the authoritative source of access control policy in the AIS. However, applications may also apply their own policy at a granularity finer than that provided by the Directory Service. For example, the Data Service may use the Directory Service to determine a subject's roles and group membership then apply its own policy to determine if the subject has the privilege to update a certain column in a table. In a looser sense, policy also includes the associations between subjects and groups/roles, since subjects get their permissions through their group membership and role assignments.

Permission/Rule. An unnamed association that specifies a return value (e.g., allow or deny) for an action/method being performed on a resource. Permissions are stored as access control information or entries in Access Control Lists (ACLs). ACLs can be stored in the directory or with each object: They are generally stored in the directory for business applications and in the COTS product for COTS applications. For scalability and manageability, permissions should be based on an object's attributes (non-discretionary access control) rather than linked directly to a specific object (discretionary access control).

Condition. Additional parameters that qualify a policy. Conditions include authentication level, authentication scheme, IP address, and time of day. Conditions will be used to implement attribute-based permissions, such as allowing access if the subject is the owner of the accessed resource.

Resource. A named logical entity in the system that may be protected through access controls. Example resources include files and services.

Security Descriptor. A set of security-related attributes associated with a specific resource. Note that Security Descriptors are not managed or persisted by the Directory Service. Security attributes include owner, security level, and security compartments (handling restrictions).

AIS Object. AIS objects include hardware devices, data files, software programs, software methods and anything else on which the AIS is capable of performing operations.

The AIS implements Application level (i.e., Read, Create, Modify, Delete) access permissions to AIS objects such as files, records, data elements, software methods and programs are granted to groups and subgroups into which subjects are assigned and the business roles they play in those groups/subgroups. Additionally, access clearances are attributed to subjects and clearance requirements are attributed to objects to enable part of the content basis for granting access. Finally, content based access restrictions such as time of day, work process step, object state and source network address provide additional granularity to policies controlling access to AIS objects.

Data transfer between Federations is accomplished using data diodes and high assurance guards. Data Diodes allow one way flow of data from dominated security domains to dominant domains. High assurance guards contain security policies that enable the secure flow of lower classified (i.e., dominated) information residing in dominant domains to pass to dominated domains.

The security architecture is based on a Multiple Independent Level of Security (MILS) approach that physically separates records into ERA Instances dedicated to their classification level. Records are preferably stored in a non-encrypted format and utilize state-of-the-art network security and high assurance guards that are presently used with the Government Intelligence Community, Department of Defense (DoD), and law enforcement. The MILS approach reduces the risk of complex and time-consuming accreditation associated with alternate multi-level security approaches and lowers the total ownership cost by minimizing the need for reaccredidation with each product or functional change.

The security architecture ensures that consumer access to the ERA through the World Wide Web provides them with exactly the information that is intended to be made available to them. Each site contains one or more ERA Instances based on the levels of classified data to be stored, including a financial system interface to integrate dissemination tasks. Each Instance contains the appropriate Ingest, Storage, Dissemination, and local services individually scaled to match the demands of the Instance, such as the quantity of information that it is expected to be ingested and stored. Partial Instances are architecturally supported and may be used to resolve producer data protection concerns, transition states, or timing issues. Each Instance is linked to the NARANET or secure Government networks based on classification level and a paired Active Safe Store site that provides redundant access to all of its records.

The ERA system is composed of ERA Instances tied together by ERA Management services resident at the System Operations Center (SOC) through an ERA WAN. These services perform critical enterprise management functions such as logistics management, business process management, and system operations management for each classification level. Interfaces to the space and inventory management and administrative systems are provided at the SOC. The ERA architecture ensures that each step in the lifecycle of a record archived by NARA is completed by the proper professionals, increasing assurance that the authenticity of each record is maintained. A workflow manager identifies the NARA-defined tasks and roles for each record at its appropriate stage in the lifecycle. Based on their sign-on and authorizations, users are presented with a portal view. They have access to the complete set of tasks requiring their attention at the selected security classification level. Tasks are units of work that act on records and collections, or perform other ERA activities.

The user can partially or fully complete tasks, performing multiple tasks in parallel. At the completion of a task, the record or collection being acted upon advances to the next workflow step that has been defined to the workflow manager. The user (which may be the same person) for that step then has this item added to his/her available set of tasks. This creates a system-generated audit trail for all tasks.

Information on the size of the backlog of tasks is shown by reports that indicate the overall status of work within the ERA system. Managers have the ability to assign and reassign tasks to different users or groups of users.

Figure 8A:
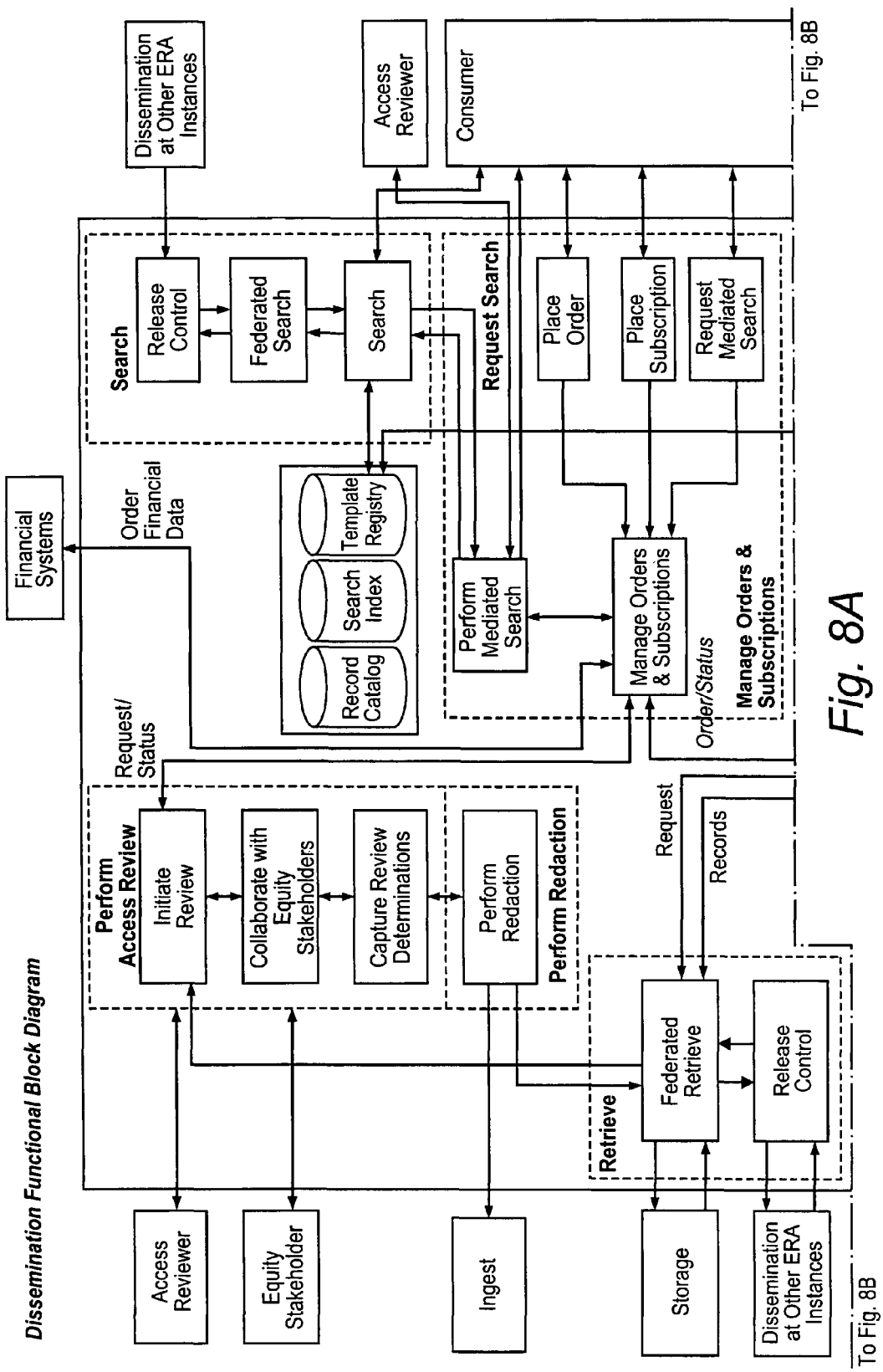
FIGS. 8A and 8B represent an exemplary dissemination functional architecture.
Figure 8B:
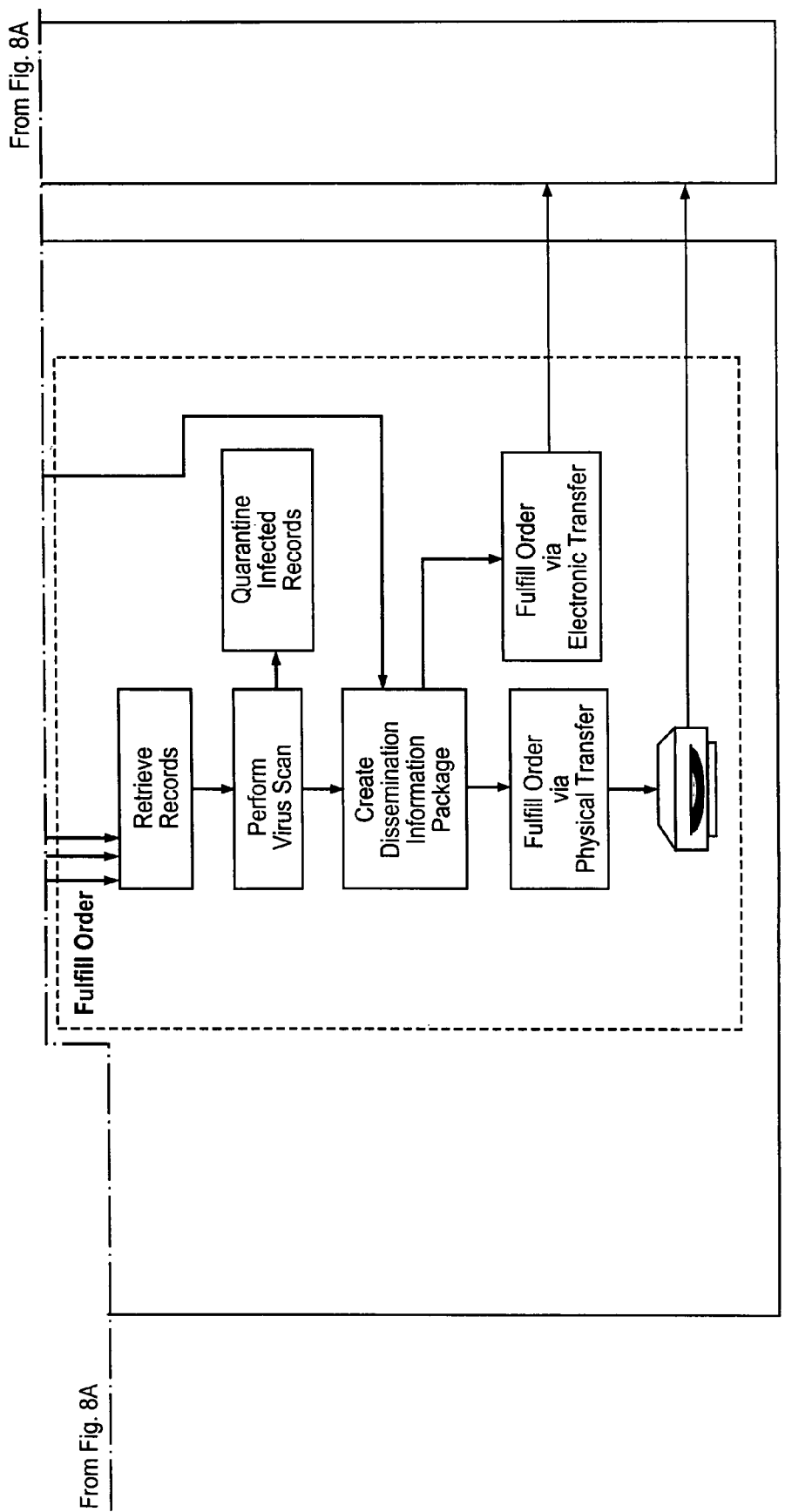

The dissemination functional architecture, shown in FIG. 8, decomposes the functions and high-level processing flows for the Dissemination Segment into constituent sub-services. This section addresses a nominal consumer request and a Freedom of Information Act (FOIA) mediated search request. Registered consumers are provided with subscription services and information on previous searches. Table 3 summarizes the functions and associated descriptions of the blocks shown in FIG. 8.

TABLE 3

| Functions | Description |
|---|---|
| | Search |
| Search | Provides a Service That Uses the Deployed Finding Aids to Provide Search Results. Based on the Metadata Contained in the Local Instance's Records Catalog and Search Index. Honors Security Access Restrictions Through Role-Based Access Control. |
| Federated Search | Connects to the Federated Search Function in the Dissemination Segment in Other Instances to Retrieve Federated Search Results from Other ERA Instances (at the Same or Lower Security Classification Level) as Appropriate. The Instance's Local Configuration Defines the Other Instances to Federated Search, and Some Classified Instances Will Not Search Other Instances. |
| Release Control | Provides a High-Assurance Guard to Ensure Secure Connections to Instances at a Lower Classification Level. |
| | Manage Orders/Subscriptions |
| Place Order | Allows Consumers to Place, Edit, Track and Cancel Orders for Records. Orders Can Include FOIA and Other Restricted Access Requests. |

TABLE 3-continued

| Functions | Description |
|---|---|
| Place Subscriptions | Allows Consumers to Place, Edit, Track, and Cancel Subscriptions for Records. |
| Request Mediated Search | Allows Consumers to Place, Edit, Track and Cancel Requests for Mediated Searches. |
| Performs Mediated Search | Provides a Set of User-Interfaces, Workflow, and Data Persistence Services for Performing Mediated Searches and Returning the Results to Consumers. |
| Manage Orders & Subscriptions | Provides Workflow and Data Persistence Services for Managing, Tracking, and Fulfilling Orders and Subscriptions. |
| Perform Access Review | |
| Initiate Review | Provides a Set of User-Interfaces, Workflow, and Data Persistence Services for Establishing Access Restrictions on Records. |
| Collaborate with Equity Stakeholders | Provides a Set of User-Interfaces, Workflow and Data Persistence Services for Collaborating with Agency Equity-Holders on Determinations and Redactions. |
| Capture Review Determinations | Provides a Set of User-Interfaces, Workflow, and Data Persistence Services for Capturing Access Review Determinations. |
| Perform Redaction | |
| Perform Redaction | Provides a Set of User-Interfaces, Workflow, and Data Persistence Services for Performing Redactions on Records, Including Coordination with Agency Equity-Holders and Capturing Determinations. The Access Reviewer Switches to the Role of Transferring Entity to Transfer Redacted Records to the Ingest Segment. |
| Retrieve | |
| Federated Retrieve | Provides a Service That Retrieves Records from the Local Instance's Storage Segment, or From Other Instances (at the Same or Lower Security Classification Level) as Appropriate. |
| Release Control | Provides a High-Assurance Guard to Ensure Secure Connections to Instances at a Lower Classification Level. |
| Fulfill Order | |
| Retrieve Records | Collects the Records Requested by the Order or Subscription. Reports. |
| Perform Virus Scan | Provides a Service That Scans Electronic Records for Virus. Records with Viruses Are Not Disseminated. |
| Quarantine Infected Records | Provides a Service That Quarantines Records Indicated as Potentially Containing Viruses by the Virus Scanning Filter. |
| Create Dissemination Information Package | Provides a Service Converts an Archival Information Package (AIP) Into a Dissemination Information Package (DIP). This May Optionally Include Separating the Preservation Metadata (including Template References) from the Content so That Access Viewers Can Open the Content Directly. |
| Fulfill Order Via Electronic Transfer | Provides a Service That Disseminates DIPs Via Electronic Transfer, Including Downloading to the Web Browser Session, Posting to an FTP Site, and Other Electronic Means. |
| Fulfill Order Via Physical Transfer | Provides a Service That Disseminations DIPs Via Physical Transfer, Including User-Interfaces, Workflow, and Data Persistence Services for Producing and Making Physical Media. |

The following bullets describe a typical consumer request workflow:

The Search function provides users with an array of best-of-breed search engines and finding aids that can be tailored to their needs. This function relies on the record catalog and search index data stores for information about the ERA collections. The Federated Search function is used for classified low and top secret, sensitive compartmented information collections. The Release Control function validates that users have the authority to obtain records at the same classification level or perform downward only searches of lower classification levels. Results are passed to the Perform Mediated Search Function.

Requests for Mediated Searches pass through the access review function to determine if the user's authorization allows them to view the complete record, or if further review is required. Access control is based on classification and/or handling restrictions as reflected in the metadata, which are automatically compared to the user's authorization to determine the user's level of access to the specific records that are requested. If the user's authorization does not meet the record access requirements, then the access review function will route the request to an access reviewer.

The consumer uses the Place Order function to acquire records of interest. Note: All dissemination requests pass through the "place order" function, even though the price for most "orders" is free. In other words, a common function supports both free and fee-for-service requests.

The Manage Orders and Subscriptions function coordinates with the NARA financial system for ordering information, and provides available options for electronic or media record delivery. All order and subscription status is managed by this function. When an order is placed, Manage Orders and Subscriptions initiates the retrieval process.

The Retrieve Records and Federated Retrieve functions obtain the record based on its location as described in the records catalog. Records available onsite are copied from the local Storage Segment. The Release Control function manages site-to-site security for records retrieved from the Storage Segment at another site.

Perform Virus Scan quarantines infected records prior to transmission to the user. This check is critical as lack of knowledge of a virus may not have allowed its detection during Ingest processing completed at an earlier time. Quarantined records are identified to records processors for action from Ingest and consumers are notified that there will be a delay in the ability to provide the record.

- The Create Dissemination Information Package function prepares the final dissemination information package. The order then is filled by the appropriate Fulfill Order function.
- FOIA requests follow some aspects of this workflow. They begin as a mediated search request. They likely require use of the federated search capabilities to address classified data. Once the records are retrieved, the unique aspects of the workflow are initiated, as described below:
- The Initiate Review function establishes the workflow to address the access restrictions that may be applied to the records.
- The Collaborate with Equity Stakeholder functions supports workflow and record review services for the access reviewer to employ as appropriate.
- The Capture Review Determinations function records determinations developed in the access review process.
- Perform Redaction provides automated tools to assist in the redaction process. Redacted documents are transferred by the access reviewer opening an Ingest Portal and following the Ingest process to place this new record in Storage.
- The access reviewer completes the FOIA request by executing the normal order fulfillment process once the redacted document has been placed in Storage.

Our Dissemination functional architecture achieves functionality, performance, high availability, and security. Search indexes and the record catalog for all sensitive but unclassified (SBU) and Presidential Records Act (PRA) sites are available at each SBU Instance and can be reached from higher level classifications via a one-directional connection provided by the Release Control function. This allows the system to load balance users to the most available dissemination server. The search and order process can be completed on any available dissemination server.

Classified sites protect compartmentalization of records by relying on federated search and retrieve functions instead of sharing classified record catalogs. The Federated Search function allows users with the highest authorization levels to run searches and retrieve records across the entire classification level and lower classification levels.

At the discretion of the transferring entity, the archivist can define record descriptions for inclusion in a lower security classification level record catalog. This permits identification of the existence of the record while limiting record access to users signed on at the correct classification level.

In addition, the Dissemination functional architecture provides a framework for deployment of best-of-breed search engines over time. This is accomplished within the Service Oriented Architecture through abstracting the search function, providing common standards-based application interfaces (e.g., XML, Structured Query Language [SQL], etc.) for the deployed product search index information received from Ingest. The Dissemination search capability invokes the search engine and finding aids, and accepts the returned results, via an XML message passing interface. The architecture and design anticipate adding and swapping finding aids and search engines as the technological evolution of the ERA Program progresses.

The search tools included in the notional design provide full text, concept, and Boolean search of record and group descriptions and keywords, as well as search of the metadata in the Record Catalog. Full text search of the content of each record item is technically achievable, but it is a cost driver for storage of the search indices, for the search engine CPUs, and the associated licenses. While professional archivists and researchers would likely use a hierarchy of group and record descriptors, a typical researcher from the public would expect a "Google" like search service. Implementing such a search capability at the initial deployment of the ERA Program would be a costly and uncertain undertaking. We estimated that such a capability would require approximately 2500 CPUs, and would require storage for the full text indices equal to approximately ⅓ of storage for the original records. In addition, this search model works well on text based formats, but not on other record formats such as imagery, GIS, maps, audio and video, and only in a limited sense on databases.

Examples of future finding aids that may be included into the ERA Program are:

- Better text search engines that require less storage or fewer CPUs to operate, which will provide better search capability at lower cost;
- Full-text index only some percentage of records, based on initial estimates and refined by measurements of the popularity of record collections and groupings;
- Finding aids and search tools tailored to GIS systems and maps;
- Digital asset management and retrieval tools tailored for audio and video; and
- Finding aids and search tools tailored to databases.

It should be noted that the search Index will most likely have to be re-generated for each new search engine that is integrated, tested, and installed. Building this new search Index can be performed as a background crawl process of the data while the old Index and search engine are still in service. This background task will have negligible impact to system performance. Any replacement of a key component such as a search engine will go through rigorous integration and testing to ensure that it is fully interoperable with the deployed system, and the impact to system performance will be negligible once the new version is deployed and goes into production.

Thus, the ERA architecture supports any number of finding aids, with minimal work to bring each new finding aid online, including possible future expansion to full text searches. Primary trade study considerations are licensing costs and the search index storage required for peak performance, contrasted by search effectiveness and speed.

The management of "subscription services" resides within the Dissemination segment of the functional architecture. This functional allocation ensures that the data is being disseminated through only one service area so that archival information is never compromised. Even though subscription services reside in Dissemination, subscriptions are still available to originators, preservers, and archivists. The intent is to properly, orderly, and methodically manage dissemination of information to any and all authorized users on a real-time ad-hoc basis or through a periodic subscription basis.

The functional view of Dissemination demonstrates its architectural independence due to the limited number of cross segment interfaces as shown in FIG. 8. The Dissemination architecture specifies one external interface to the NARA financial system, such as the Order Fulfillment and Accounting System (OFAS), to support consumer ordering and payment. Data manipulation is performed to allow legacy interfaces to operate unchanged and offer an open application programming interface to new applications. The benefits of our Dissemination architecture are discussed in Table 4.

TABLE 4

| Driving Requirement | Approach | Benefit |
|---|---|---|
| Preserving authenticity of electronic records | Dissemination users have read-only access to records. Redacted records created in this segment are forwarded to the Ingest Segment to be stored. | The risk of accidental destruction of record authenticity by dissemination users is eliminated. |
| Manage lifecycle of both non-electronic and electronic records | Establish a common workflow approach for all record types. Provide functionality to establish non-electronic catalogs and merge with electronic record catalogs. | NARA can expand the usefulness of the investment in the ERA to reduce human resource costs. |
| Scalability | Additional processors can be added to address users load because the architecture supports cluster processing. Dissemination instances scalable from workstation to enterprise class servers. | NARA can address changes in user demand with straightforward hardware purchases. |
| Extensibility | Finding aids connect to search index in addition to record catalog, expanding support to more commercial search engines. | Extensible to address future full text searches through search index approach. |
| Evolve-ability and adherence to open standards | Our architecture supports an open search framework based on commercial standards, including provision of a search index, XML tags, SQL schema, etc. | Allows multiple "best-of-breed" finding aids to be deployed, upgraded or changed over time. |
| Deployment flexibility | Define loosely coupled architecture that allows independent scaling of the Dissemination Segment, partial Instances, and remote location of terminals and/or servers. | NARA can deploy partial Dissemination instances for temporary or long term use. |

The following definitions are used herein:

Dominate—one security level dominates another if and only if the hierarchical part of the first level is greater than or equal to the hierarchical part of the second level; and the set of compartments associated with the first includes all of the compartments associated with the second; e.g., S/A dominates S and TS/A dominates TS, but TS does not dominate S/A.

Incomparable—two levels are incomparable if both have compartments not present in the other; e.g., TS/A is incomparable to S/B.

*-property (star property)—Data can be transmitted from instance 1 to instance 2 if either Instance 2 dominates instance 1

The data in the transmission from instance 1 can be proven to be dominated by instance 2 (which applies to "acks" 2, for example)

C&A (Certification and Accreditation)

Certification is a technical evaluation of the system to ensure that the security requirements are met (includes personnel, physical, technical) including assuring that the security controls cannot be subverted or bypassed.

Accreditation is a declaration that the system is approved to operate in a particular environment with an acceptable level of risk.

The exemplary embodiments enable anyone to search and retrieve any records his instance dominates and enable anyone anywhere at any level to learn of the existence of a record anywhere else in federated space irrespective of dominance.

One exemplary embodiment included a federated data archive consisting of:

One logical Sensitive But Unclassified (SBU) data archive containing:

A Record Storage, Record Catalog and Search Index logically united: each SBU instantiation has a record catalog and search index that covers all SBU instantiations; and One search obtains results from the entire SBU archive; and One classified archive for each classified instantiation containing:

A Record Storage, Record Catalog and Search Index for each classified instantiation;

A normal search encompasses only that instantiation; and

A federated search encompasses all participating/accessible instantiations accessibility is voluntary.

The following assumptions were made:

All Record Catalog entries would be SBU; or at least there would be an SBU version of all or nearly all Records.

There would be multiple levels of descriptions per "group" of records ("group" ranges from 1 to n, depending on a number of factors) & different levels would have different classifications from SBU up to the site level.

Archive and Search Indices were expected to be very, very large; Record Catalog is relatively small but still sizable.

At least in our design, everything dominates SBU; so a demonstrably "pure" SBU entity can flow anywhere.

The owners/controllers of some instances might choose to not connect to the rest of ERA.

In this exemplary embodiment, a federated search could be performed where the query is sent to all participating instantiations; including ones at different classifications/compartments; if dominated by the origin instance. The system provided for release control mechanisms (High Assurance Guards and/or human reviewers) and data diodes to govern the flow between instantiations. In the system each instance consisted of three major entities. An Archivist creates:
An Archive Record; and
A Record Catalog entry; and
A Search Index is built automatically from Record Catalog and Record Archive entries available to the instantiation (multiple instantiations per site perhaps).
Problems to be overcome were:
Query content was basically uncontrolled, potentially allowing classified information to flow inappropriately;
It was extremely difficult to automatically verify query content;
Trusted verification by user personnel was not practical; and
This meant that the system was at risk of not being accredited.
This led to the following goals and constraints:
Broaden scope of searches as much as possible while restricting data flow to that permitted by security rules:
Information may flow from dominated instantiations without a security concern; and
Information flow to dominated instantiations must be "proven" to be no "higher" than the "lower" site.
First Alternative
As each new set of records is accessioned, the catalog entries will be dispersed to all federated instances.
The input archivist will create the catalog entries and ensure that they are SBU in content. He will digitally sign the entries to attest to this.
A "release" archivist or agent of the originating agency will review the signed catalog entries and will also sign to attest to his review.
The second person will then send out the entries to all federated instances (some will opt out).
At each site, the search index will be based on all the local records and their catalog entries plus all the catalog entries for the federated instances.
Advantage:
Highly likely to be accredited
Consumers can learn of the existence of records on any federated instance.
Disadvantage:
Searches are based on only catalog entries for federated sites.
Consumer has to find an alternate connection to get record access.
Second Alternative
This Second Alternative contains all the features of the First Alternative and adds some record sharing.
At each instance, when the search index is augmented, the search index builder will request from dominated instances, the record content it needs to ensure the search index includes both the description and the record as input.
Advantage
Increases the probability that applicable records will be found by searches
Almost certain to be accredited
Disadvantage
Large volumes of data movement potentially
Consumer has to find alternate connection to get record access.

Third Alternative
This Third Alternative contains all the features of the First Alternative and adds record index sharing.
Whenever a federated search is performed, the originating instance requests the search index from all its federated partners.
Advantage
Data movement only for federated searches
Almost certain to be accredited
Disadvantage
Consumer has to find alternate connection to get record access
Not clear that this is a better performer than Option 2 for no more capability.
Fourth Alternative
This Fourth Alternative contains all the features of either the Second or Third Alternative and adds full record sharing.
When a federated search is done, matches result in a request to dominated, federated partners for matching records.
Advantage
Consumer gets full results from all records he is entitled to see
Probably a little less likely to be accredited than options 2 or 3
Disadvantage
Potentially large data movements in response to searches (e.g. ALL SBU matches have to flow to originating site)
Fifth Alternative
This Fifth Alternative is a variation on the initial design.
When a federated query is created, the query is inspected by a user release control agent who attests (by signing) that the query content is SBU. The query is then released to dominated instances.
Advantage
Fairly straightforward
Gives all bid function
Disadvantage
Potentially high user workload
User employee at risk for not fully comprehending context of query
Not nearly as easily accredited as other redesions.
While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, e.g., aspects of one embodiment may be combined with aspects of another embodiment to realize yet other embodiments.

What is claimed is:
1. A system for establishing and maintaining a plurality of records and/or documentary materials to be persisted in, and accessible from, an electronic archives system, comprising:
safeguarding programmed logic circuit means configured to safeguard each said record and/or documentary material throughout its entire lifecycle including record and/or documentary material of enduring historic value that must be retained forever, by monitoring and recording both intended changes to each said record and/or documentary material and its corresponding status, as well as unintended changes to each said record and/or documentary material;

extracting and preserving programmed logic circuit means configured to extract and preserve context and structure associated with each said record and/or documentary material;

custody programmed logic circuit means configured to establish and preserve uninterrupted proof-of-custody including at least a source for each said record and/or documentary material throughout its entire lifecycle;

essential characteristic programmed logic circuit means configured to capture and preserve essential characteristics of each said record and/or documentary material throughout its lifecycle in dependence on one or more changeable definitions of essential characteristic;

transformation means for continually transforming said record and/or documentary material of enduring historic value that must be retained forever to persistent non-delete formats;

at least one storage location configured to store the plurality of records and/or documentary materials and all preserved information; and access control means programmed to allow a user access to the system based on one or more user attributes and/or one or more object attributes.

2. The system of claim 1, wherein said user attributes include group affiliation, business role, clearance or access level, and network address from which access is requested.

3. The system of claim 2, wherein said object attributes include required clearance level, group ownership, and state which includes workflow step and time of day.

4. The system of claim 1, wherein said object attributes include required clearance level, group ownership, and state which includes workflow step and time of day.

5. A computer-implemented method for establishing and maintaining authenticity of a plurality of records and/or documentary materials to be persisted in, and accessible from, an electronic archives system, the method comprising:

using at least one processor having associated memories and input/output ports to perform the following, safeguarding each said record and/or documentary material throughout its entire lifecycle including record and/or documentary material of enduring historic value that must be retained forever, by monitoring and recording both intended changes to each said record and/or documentary material and its corresponding status, as well as unintended changes to each said record and/or documentary material;

extracting and preserving context and structure associated with each said record and/or documentary material;

establishing and preserving uninterrupted proof-of-custody including at least a source for each said record and/or documentary material throughout its entire lifecycle;

capturing and preserving essential characteristics of each said record and/or documentary material throughout its lifecycle in dependence on one or more changeable definitions of essential characteristics; and continually transforming said record and/or documentary material of enduring historic value that must be retained forever to persistent non-delete formats;

storing the plurality of records and/or documentary materials and all preserved information; and accessing the plurality of records and/or documentary materials in accordance with user attributes and object attributes, wherein the archives system is scalable essentially without limitation, and wherein the authenticity of the plurality of records and/or documentary materials is comprehensively storable and maintainable over an indefinite period of time in a obsolescence-proof manner despite changeability of the records and/or documentary materials, record and/or documentary material custody, and/or essential characteristic definitions.

6. The method of claim 5, wherein said user attributes include group affiliation, business role, clearance or access level, and network address from which access is requested.

7. The method of claim 6, wherein said object attributes include required clearance level, group ownership, and state which includes workflow step and time of day.

8. The method of claim 5, wherein said object attributes include required clearance level, group ownership, and state which includes workflow step and time of day.

9. A computer-implemented method for establishing and maintaining authenticity of a plurality of records and/or documentary materials to be persisted in, and accessed from, an electronic archives system, the method comprising:

using at least one processor having associated memories and input/output ports to perform the following, inspecting transfer media from a transferring entity to ensure that said transfer media contains at least one record and/or documentary material including record and/or documentary material of enduring historic value that must be retained forever, to be ingested;

storing the at least one record and/or documentary material to be ingested in a temporary storage location;

ensuring that the transfer media is mounted for upload into the system;

performing at least one security and/or integrity check on the transfer media;

performing at least one validation check on the at least one record's and/or documentary material's bit-stream;

storing the at least one record and/or documentary material to at least one managed storage location;

resolving any outstanding verification issues with the transferring entity;

persisting necessary metadata for the at least one record's and/or documentary material's lifecycle;

continually transforming said record and/or documentary material of enduring historic value that must be retained forever to persistent non-delete formats; and accessing the at least one record and/or documentary material in accordance with user attributes and object attributes, wherein the archives system is scalable essentially without limitation, and wherein the authenticity of the plurality of records and/or documentary materials is comprehensively storable and maintainable over an indefinite period of time in a obsolescence-proof manner despite changeability of the records and/or documentary materials, record and/or documentary material custody, and/or essential characteristic definitions.

10. The method of claim 9, wherein said user attributes include group affiliation, business role, clearance or access level, and network address from which access is requested.

11. The method of claim 10, wherein said object attributes include required clearance level, group ownership, and state which includes workflow step and time of day.

12. The method of claim 9, wherein said object attributes include required clearance level, group ownership, and state which includes workflow step and time of day.

* * * * *